US011233712B2

(12) United States Patent
Adiletta et al.

(10) Patent No.: US 11,233,712 B2
(45) Date of Patent: Jan. 25, 2022

(54) TECHNOLOGIES FOR DATA CENTER MULTI-ZONE CABLING

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 15/395,995

(22) Filed: Dec. 30, 2016

(65) Prior Publication Data

US 2018/0026851 A1 Jan. 25, 2018

Related U.S. Application Data

(60) Provisional application No. 62/365,969, filed on Jul. 22, 2016, provisional application No. 62/376,859, (Continued)

(51) Int. Cl.
*G02B 6/38* (2006.01)
*G06F 3/06* (2006.01)
(Continued)

(52) U.S. Cl.
CPC ............ *H04L 43/08* (2013.01); *G02B 6/3882* (2013.01); *G02B 6/3893* (2013.01);
(Continued)

(58) Field of Classification Search
CPC combination set(s) only.
See application file for complete search history.

(56) References Cited

U.S. PATENT DOCUMENTS 9,606,316 B1 * 3/2017 Gandhi ................. H04L 41/145
9,989,724 B2 * 6/2018 Raza ................... H04Q 11/0066
(Continued)

FOREIGN PATENT DOCUMENTS

WO WO-2012154751 A1 * 11/2012 ......... H04L 41/0806

OTHER PUBLICATIONS

LightFool Blog, Cable Color Codes, prior to 2012, WordPress, https://lightfool.wordpress.com/features/cable/cable-color-codes/ (Year: 2012).*

(Continued)

*Primary Examiner* — Chris Parry
*Assistant Examiner* — Chouat Abderrahmen
(74) *Attorney, Agent, or Firm* — Compass IP Law PC

(57) ABSTRACT

Technologies for connecting data cables in a data center are disclosed. In the illustrative embodiment, racks of the data center are grouped into different zones based on the distance from the racks in a given zone to a network switch. All of the racks in a given zone are connected to the network switch using data cables of the same length. In some embodiments, certain physical resources such as storage may be placed in racks that are in zones closer to the network switch and therefore use shorter data cables with lower latency. An orchestrator server may, in some embodiments, schedule workloads or create virtual servers based on the different zones and corresponding latency of different physical resources.

9 Claims, 21 Drawing Sheets

Related U.S. Application Data filed on Aug. 18, 2016, provisional application No. 62/427,268, filed on Nov. 29, 2016.

(51) Int. Cl.

| | |
|---|---|
| *G06F 13/40* | (2006.01) |
| *H04L 12/26* | (2006.01) |
| *G06F 16/901* | (2019.01) |
| *H04B 10/25* | (2013.01) |
| *G02B 6/42* | (2006.01) |
| *G02B 6/44* | (2006.01) |
| *G06F 1/18* | (2006.01) |
| *G06F 1/20* | (2006.01) |
| *G06F 8/65* | (2018.01) |
| *G06F 9/30* | (2018.01) |
| *G06F 9/4401* | (2018.01) |
| *G06F 9/54* | (2006.01) |
| *G06F 12/109* | (2016.01) |
| *G06F 12/14* | (2006.01) |
| *G06F 13/16* | (2006.01) |
| *G08C 17/02* | (2006.01) |
| *G11C 5/02* | (2006.01) |
| *G11C 7/10* | (2006.01) |
| *G11C 11/56* | (2006.01) |
| *G11C 14/00* | (2006.01) |
| *H03M 7/30* | (2006.01) |
| *H03M 7/40* | (2006.01) |
| *H04L 12/24* | (2006.01) |
| *H04L 12/931* | (2013.01) |
| *H04L 12/947* | (2013.01) |
| *H04L 29/08* | (2006.01) |
| *H04L 29/06* | (2006.01) |
| *H04Q 11/00* | (2006.01) |
| *H05K 7/14* | (2006.01) |
| *G06F 15/16* | (2006.01) |
| *G06F 9/38* | (2018.01) |
| *G06F 9/50* | (2006.01) |
| *H04L 12/851* | (2013.01) |
| *H04L 12/811* | (2013.01) |
| *H05K 5/02* | (2006.01) |
| *H04W 4/80* | (2018.01) |
| *G06Q 10/08* | (2012.01) |
| *G06Q 10/00* | (2012.01) |
| *G06Q 50/04* | (2012.01) |
| *H04J 14/00* | (2006.01) |
| *H04L 12/911* | (2013.01) |
| *B25J 15/00* | (2006.01) |
| *B65G 1/04* | (2006.01) |
| *H05K 7/20* | (2006.01) |
| *H04L 12/939* | (2013.01) |
| *H04W 4/02* | (2018.01) |
| *H04L 12/751* | (2013.01) |
| *G06F 13/42* | (2006.01) |
| *H05K 1/18* | (2006.01) |
| *G05D 23/19* | (2006.01) |
| *G05D 23/20* | (2006.01) |
| *H04L 12/927* | (2013.01) |
| *H05K 1/02* | (2006.01) |
| *H04L 12/781* | (2013.01) |
| *H04Q 1/04* | (2006.01) |
| *G06F 12/0893* | (2016.01) |
| *H05K 13/04* | (2006.01) |
| *G11C 5/06* | (2006.01) |
| *G06F 11/14* | (2006.01) |
| *G06F 11/34* | (2006.01) |
| *G06F 12/0862* | (2016.01) |
| *G06F 15/80* | (2006.01) |
| *H04L 12/919* | (2013.01) |
| *G06F 12/10* | (2016.01) |
| *G06Q 10/06* | (2012.01) |
| *G07C 5/00* | (2006.01) |
| *H04L 12/28* | (2006.01) |
| *H04L 29/12* | (2006.01) |
| *H04L 9/06* | (2006.01) |
| *H04L 9/14* | (2006.01) |
| *H04L 9/32* | (2006.01) |
| *H04L 12/933* | (2013.01) |

(52) U.S. Cl.
CPC ......... *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 15/161* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F*

2212/1044 (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087* (2013.01); *G06Q 10/20* (2013.01); *G06Q 50/04* (2013.01); *G07C 5/008* (2013.01); *G08C 2200/00* (2013.01); *G11C 5/06* (2013.01); *H03M 7/30* (2013.01); *H03M 7/3084* (2013.01); *H03M 7/40* (2013.01); *H03M 7/4031* (2013.01); *H03M 7/6005* (2013.01); *H03M 7/6023* (2013.01); *H04B 10/25* (2013.01); *H04J 14/00* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/12* (2013.01); *H04L 41/147* (2013.01); *H04L 41/5019* (2013.01); *H04L 43/065* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/555* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/34* (2013.01); *H04Q 1/04* (2013.01); *H04Q 11/00* (2013.01); *H04Q 11/0005* (2013.01); *H04Q 11/0062* (2013.01); *H04Q 11/0071* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/023* (2013.01); *H04W 4/80* (2018.02); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1485* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *H05K 2201/066* (2013.01); *H05K 2201/10121* (2013.01); *H05K 2201/10159* (2013.01); *H05K 2201/10189* (2013.01); *Y02D 10/00* (2018.01); *Y02P 90/30* (2015.11); *Y04S 10/50* (2013.01); *Y04S 10/52* (2013.01); *Y10S 901/01* (2013.01)

(56) References Cited

U.S. PATENT DOCUMENTS

| | | | | |
|---|---|---|---|---|
| 10,524,380 | B2* | 12/2019 | Brink | H05K 7/1491 |
| 2007/0165618 | A1* | 7/2007 | Niazi | H04L 49/351 |
| | | | | 370/360 |
| 2009/0116178 | A1* | 5/2009 | Champion | H05K 7/1492 |
| | | | | 361/624 |
| 2010/0306408 | A1 | 12/2010 | Greenberg et al. | |
| 2012/0116590 | A1* | 5/2012 | Florez-Larrahondo | |
| | | | | G06F 1/206 |
| | | | | 700/275 |
| 2013/0003726 | A1 | 1/2013 | Sindhu et al. | |
| 2013/0088971 | A1 | 4/2013 | Anantharam et al. | |
| 2015/0319878 | A1* | 11/2015 | Morales | H05K 7/20709 |
| | | | | 361/679.46 |
| 2016/0073544 | A1* | 3/2016 | Heyd | G06F 1/187 |
| | | | | 361/679.31 |
| 2018/0070157 | A1* | 3/2018 | Menard | H04Q 11/0005 |

OTHER PUBLICATIONS

International search report for PCT application No. PCT/US2017/038548, dated Dec. 14, 2017 (5 pages).

Written opinion for PCT application No. PCT/US2017/038548, dated Dec. 14, 2017 (10 pages).

Introducing data center fabric, the next-generation Facebook data center network, https://code.facebook.com/posts/360346274145943/introducing-data-center-fabric-the-next-generation-facebook-data-center-network/, dated Nov. 14, 2014, accessed Jan. 1, 2018 (14 pages).

Alexey Andreyev: "Introducing data center fabric, the next-generation Facebook date center network", Nov. 14, 2014 (Nov. 14, 2014), retrieved from the Internet: https://engineering.fb.com/2014/11/14/production-engineering/introducing-data-center-fabric-the-next-generation-facebook-data-center-network/, 11 pages.

Extended European Search Report for Patent Application No. 17831511.5, dated Jul. 2, 2020, 8 pages.

Partial supplementary European search report for European patent application No. 17831511.5, dated Feb. 19, 2020.

* cited by examiner

*Data Center 300*

Data Center 300

TECHNOLOGIES FOR DATA CENTER MULTI-ZONE CABLING

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

A data center may include several racks of computing resources such as servers. The various servers and racks in the datacenter are typically connected to each other through one or more network switches using data cables, such as electrical data cables or optical data cables. Since every rack may be a different distance from the network switch to which it is connected, the data cable connecting a rack to a network switch may have a length that depends on the particular distance between the rack and the network switch.

A data server may also include one or more spine switches, which connect to the network switches that connect directly to the racks using data cables. Similar to the data cables connecting the network switches to the racks, the data cables connecting the spine switches to the network switches may have a length corresponding to the particular distance between a given network switch and a given spine switch.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
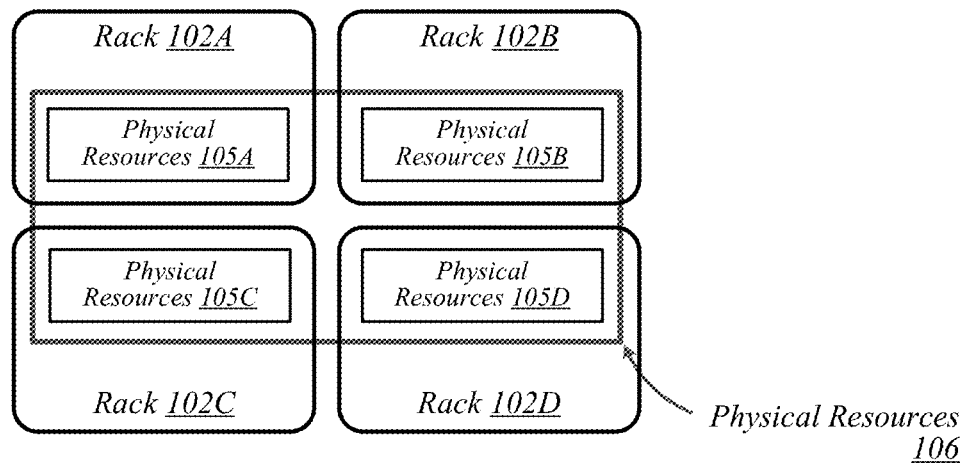
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as Dual In-line Memory Modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, Application Specific Integrated Circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
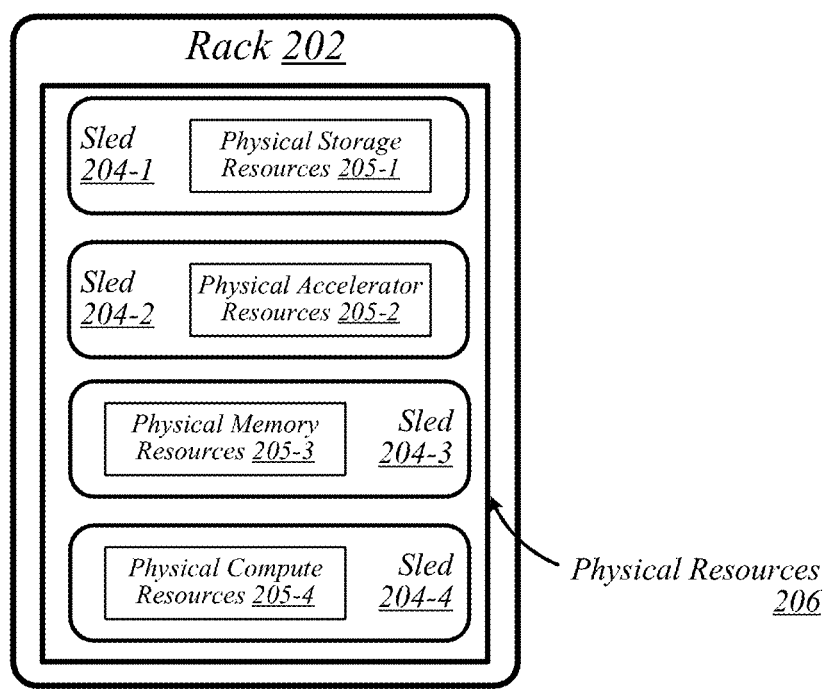
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
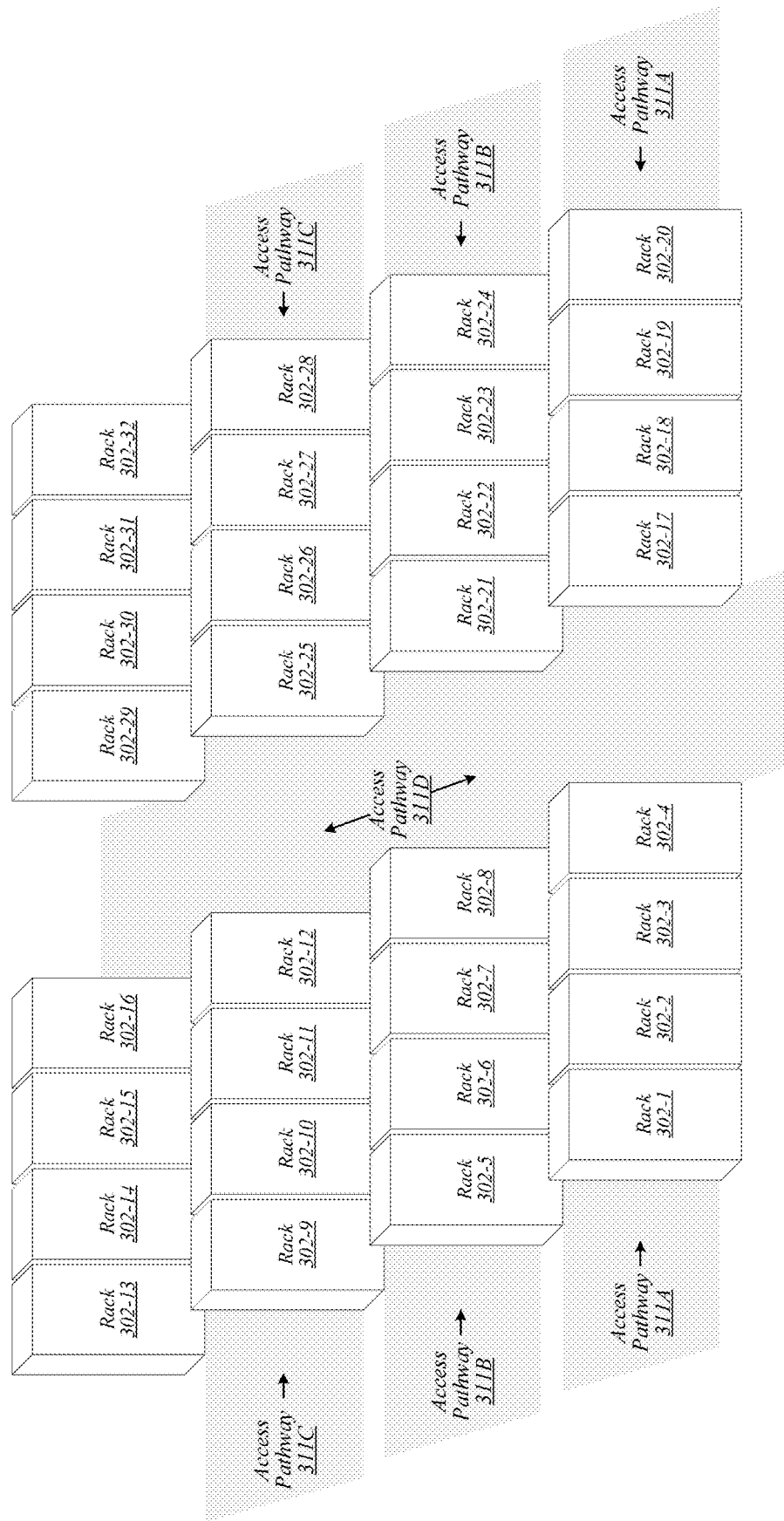
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
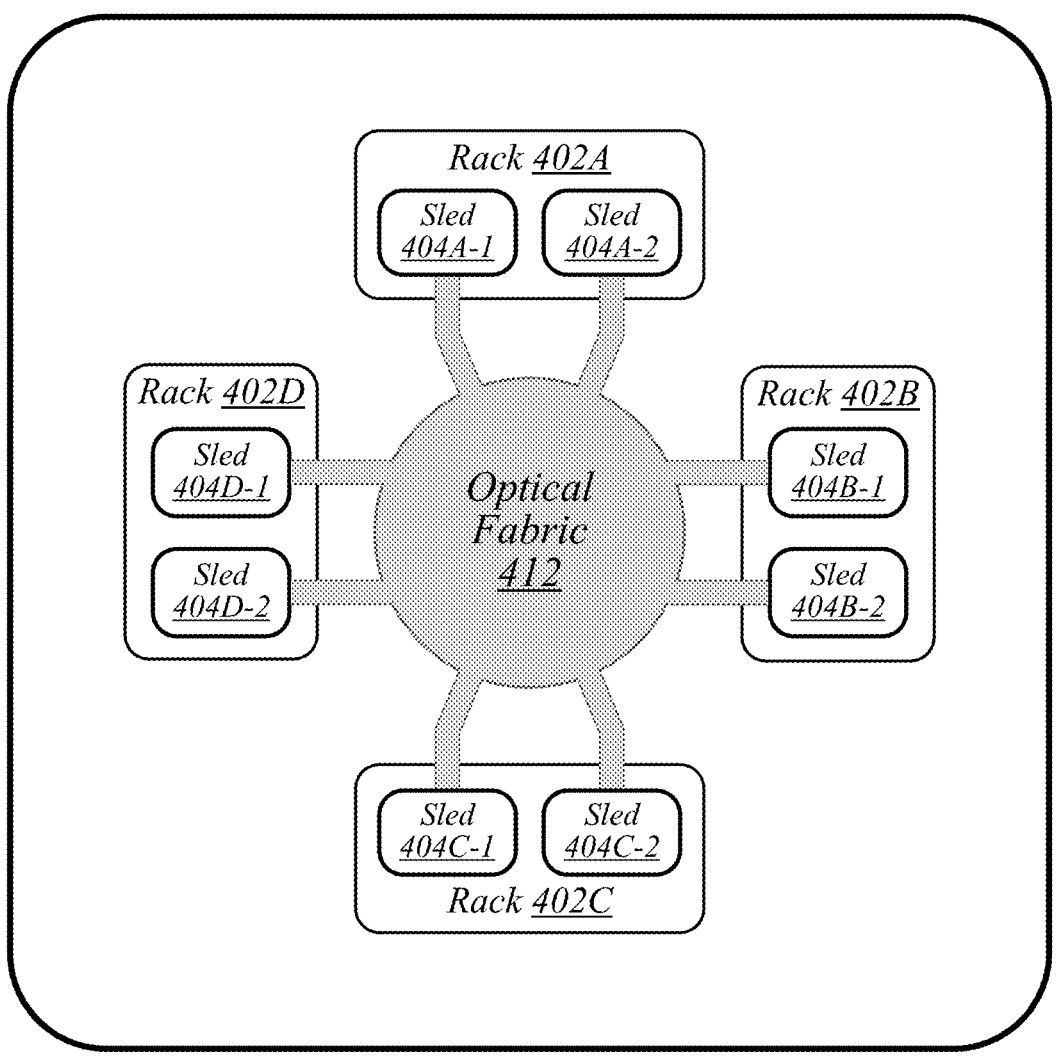
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
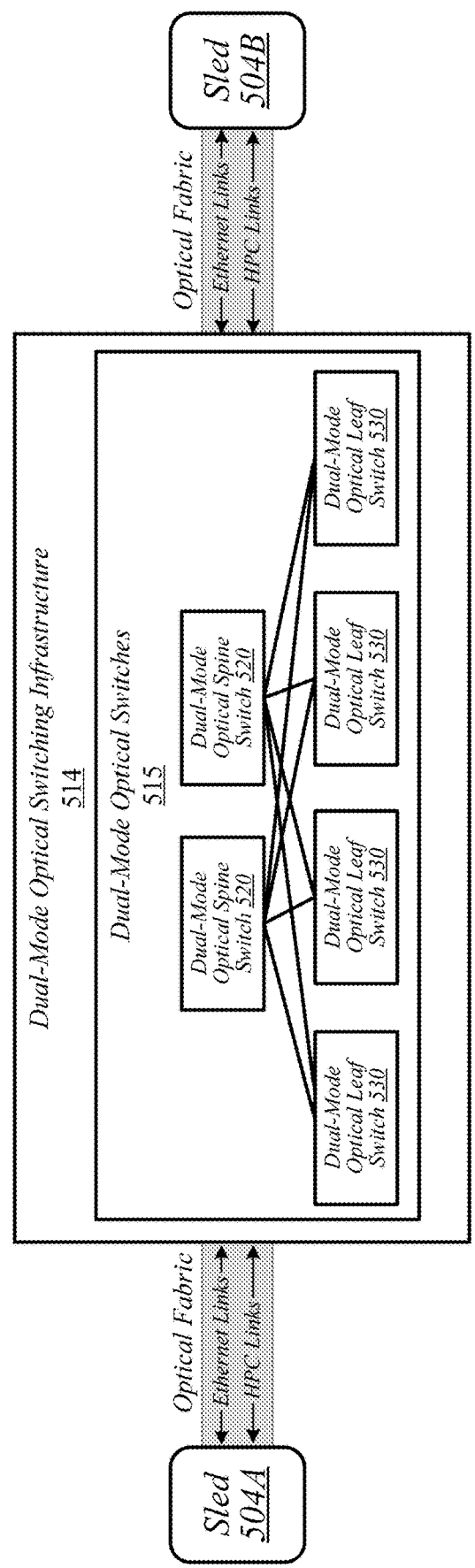
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
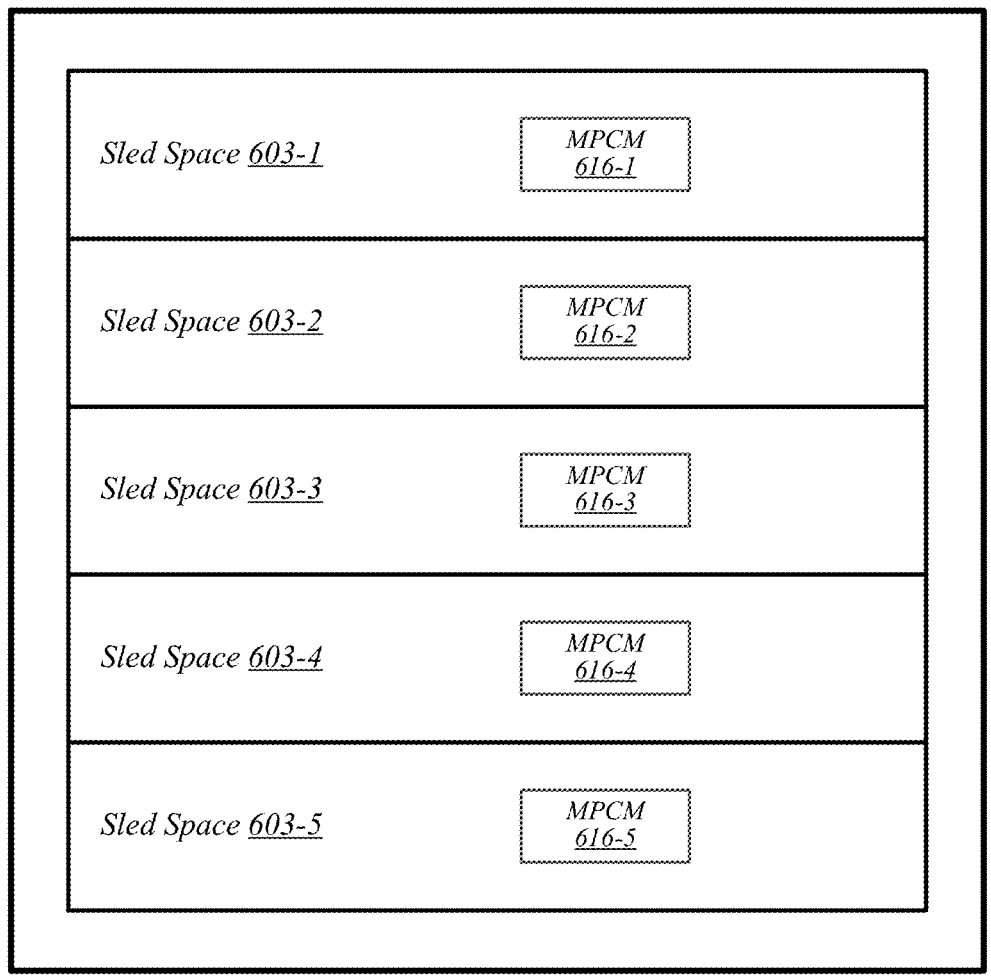
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
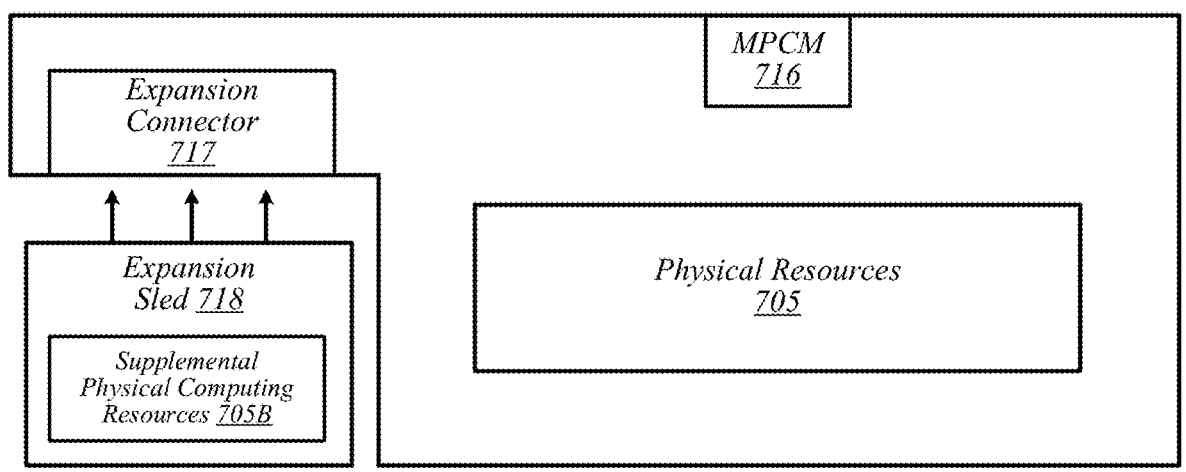
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
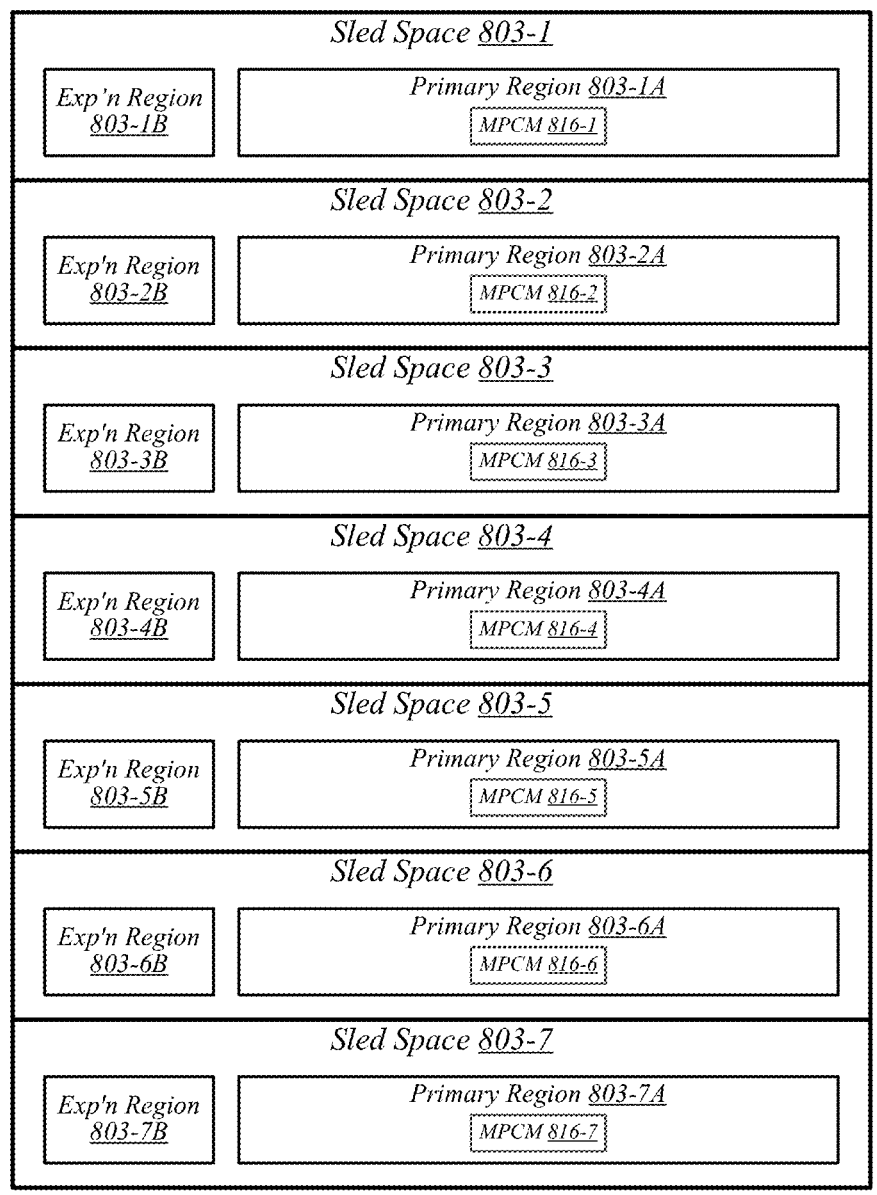
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
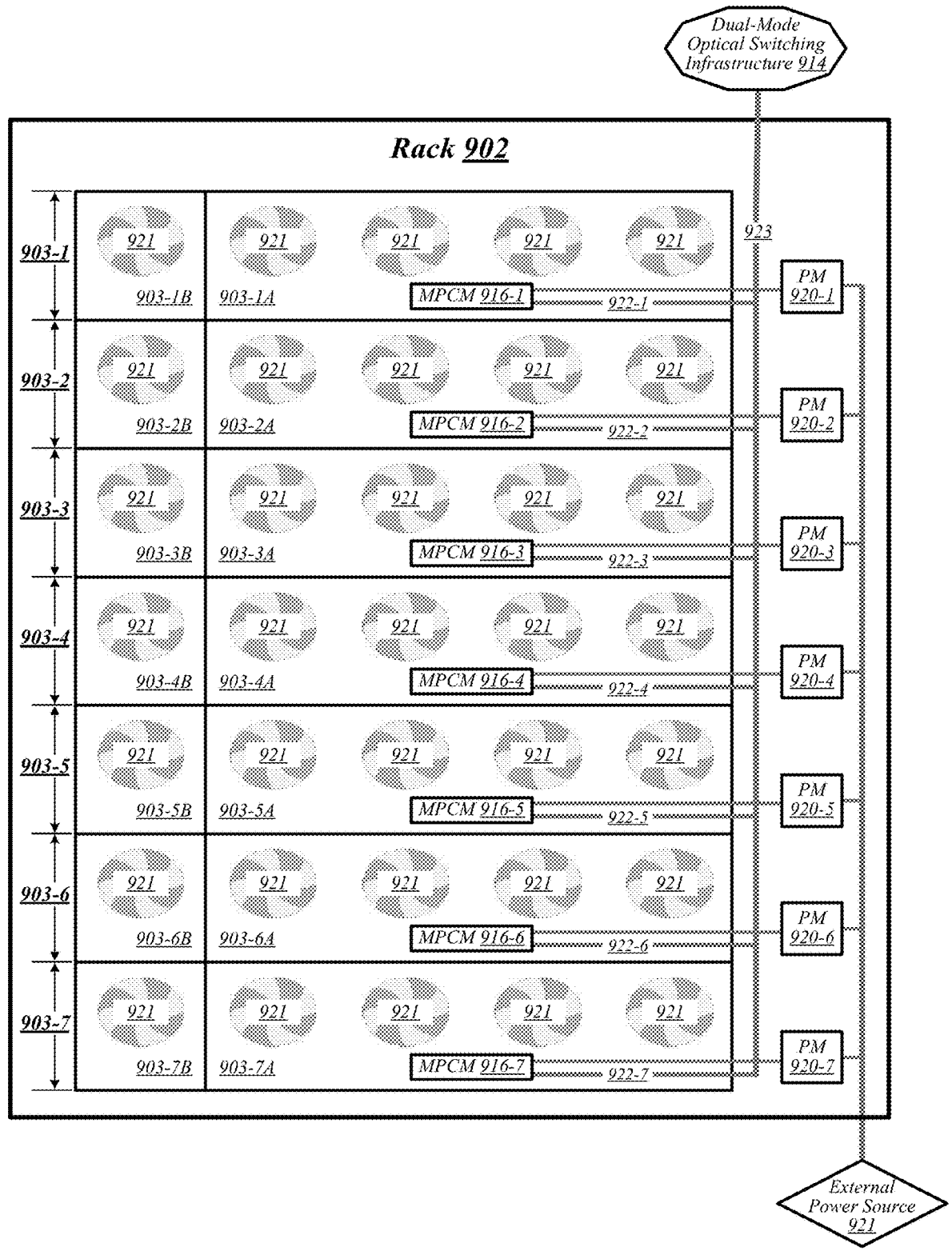
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
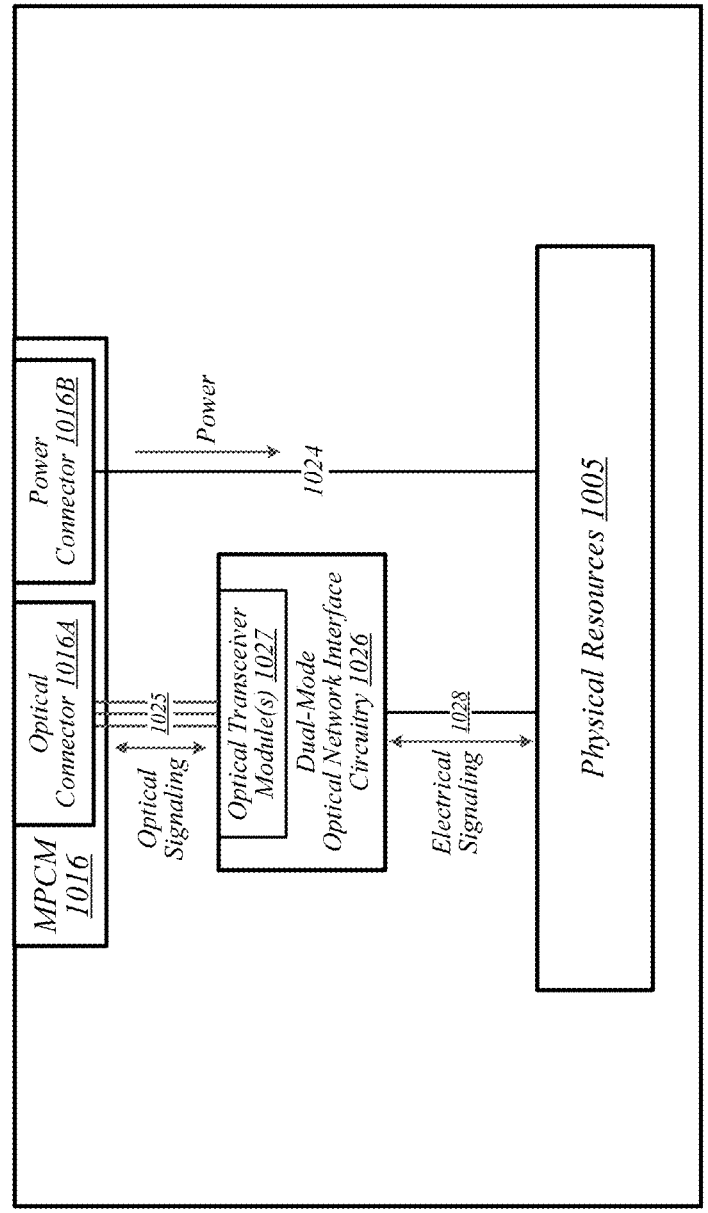
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
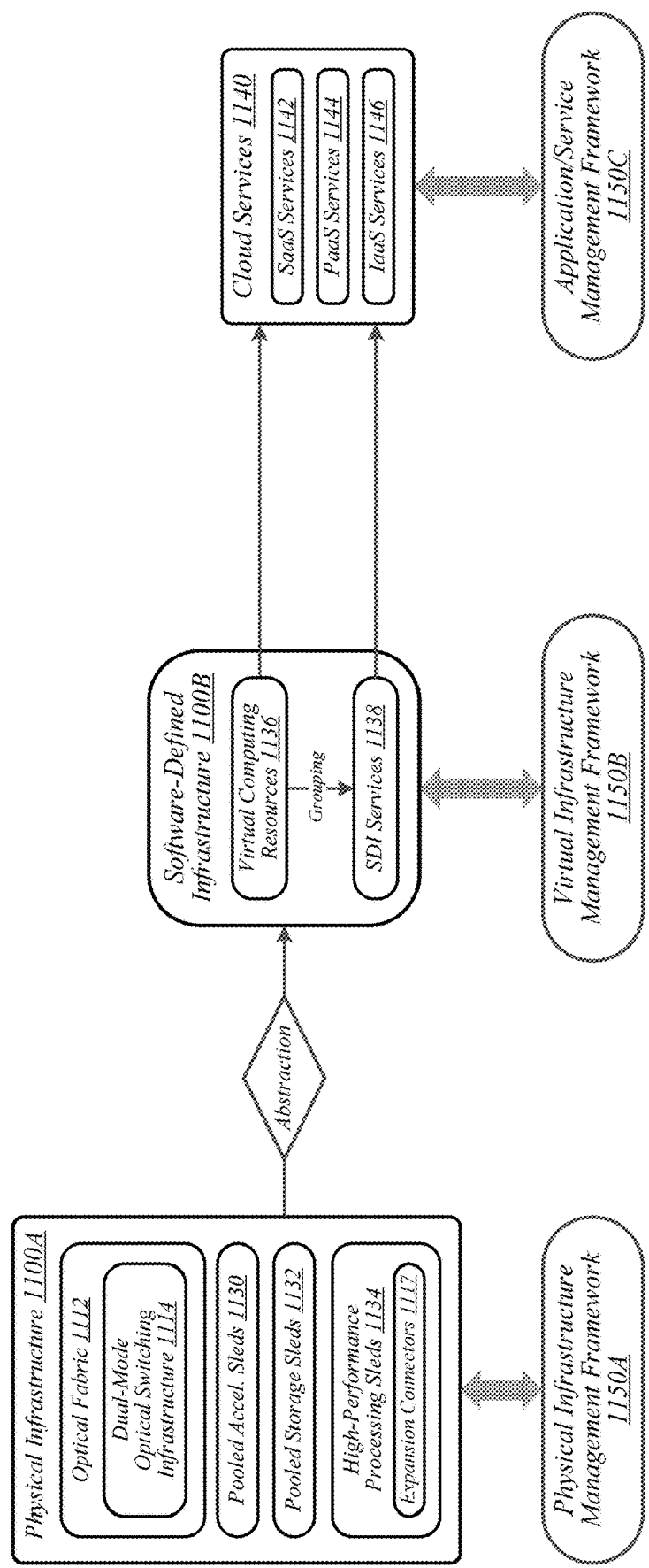
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Referring now to FIGS. 12-21, in some embodiments, each rack 302 and/or each sled 204 may be grouped into a zone based on a distance from the rack 302 and/or sled 204 to the network switch 1204 to which it is attached. A data cable used to connect each rack 302 and/or sled 204 may have a certain length which is determined by which zone the rack and/or 204 is in. It should be appreciated that such a configuration allows for the data cables used in the data center 300 to be manufactured with relatively few different lengths without significantly impacting the latency or cost of a given data cable.

Figure 12:
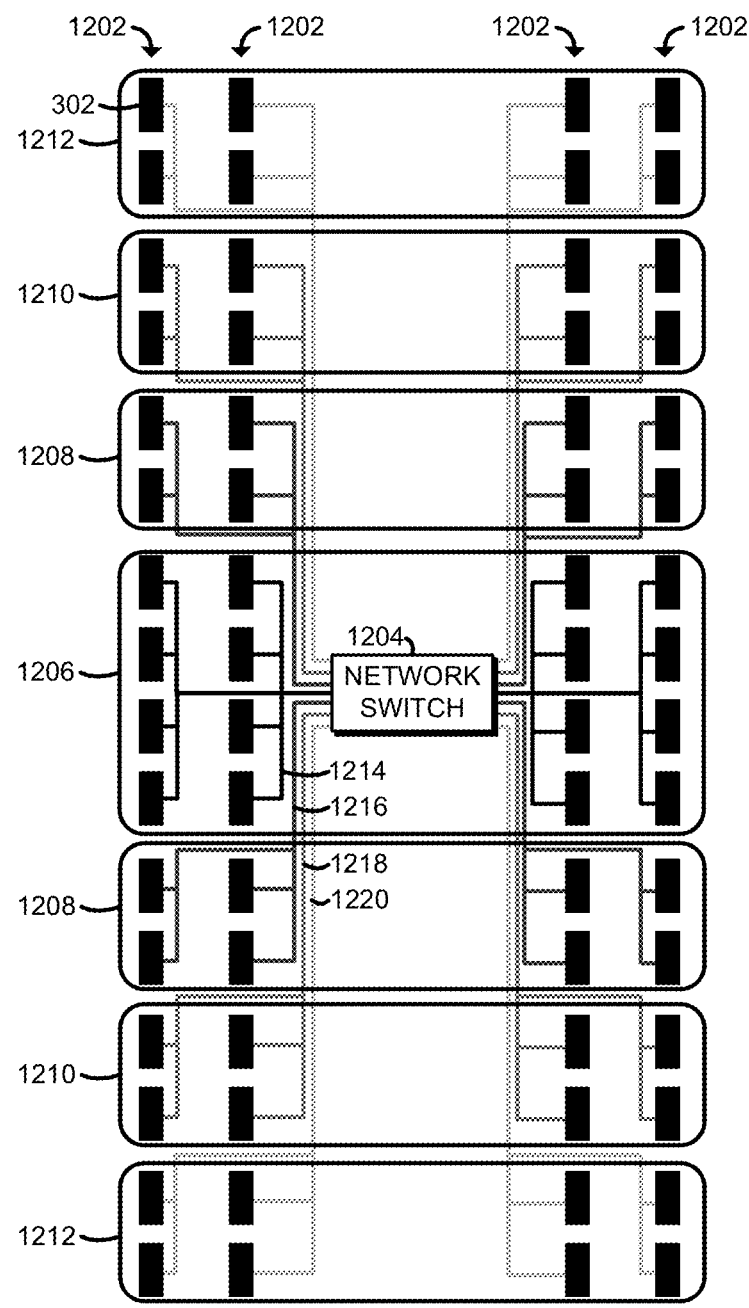
FIG. 12 is a diagram of an example embodiment of a data center in which the length of a data cable used to connect to a network switch to a rack depends on a zone of the rack.

Referring now to FIG. 12, an illustrative data center 300 may arrange the racks 302 into one or more rows 1202, with each rack 302 including several sleds 204 (not shown in FIG. 12) and connected to a network switch 1204. It should be appreciated that the network switch 1204 may be connected to an intermediate switch at the rack 302 (such as through a top-of-rack switch 1302 as shown below in FIG. 13A) or may be directly connected to the sleds 204 of the rack 302 (as shown below in FIGS. 14 & 15). Only one rack 302 in FIG. 12 is labeled in the interest of clarity, but each solid black rectangle represents a rack 302. The data center 300 may include any number of racks 302 and/or sleds 204. In the illustrative embodiment, the network switch 1204 may be connected to 64 racks 302, each with 16 sleds 204, for a total of 1,024 sleds 204 connected to the same network switch 1204. In other embodiments, the network switch 1204 may be connected to more than, fewer than, or equal to 2, 4, 8, 16, 32, 64, 128, or 256 racks 302, with each rack 302 having more than, fewer than, or equal to 2, 4, 8, 16, 32, or 64 sleds 204.

The racks 302 of FIG. 12 are organized into zones based on a distance from the rack 302 to the network switch 1204. The racks 302 of FIG. 12 are grouped into a first zone 1206, a second zone 1208, a third zone 1210, and a fourth zone 1212. In some embodiments, different sleds 204 in the same rack 302 may be considered to be in different zones. In other embodiments, all of the sleds 204 in the same rack 302 may always be considered to be in the same zone. A data cable of the same length is used to connect the network switch 1204 to each rack 302 and/or sled 204 in the same zone. As shown in FIG. 12, a first length data cable 1214 is used to connect the racks 302 in the first zone 1206, a second length data cable 1216 is used to connect the racks 302 in the second zone 1208, a third length data cable 1218 is used to connect the racks 302 in the third zone 1210, and a fourth length data cable 1220 is used to connect the racks 302 in the fourth zone 1212. Each data cable of the same shade is the same type, but not every data cable in FIG. 12 is labeled in the interest of clarity. Each data cable 1214-1220 may be an electrical cable (e.g., copper cable) or optical cable. It should be appreciated that each data cable of a given type (e.g., each first length data cable 1214) is approximately the same length. As used herein, two data cables are considered to be approximately the same length if the length of the shorter data cable is within 1% of the length of the longer data cable or if the length of the shorter cable is within 5 centimeters of the length of the longer data cable, unless explicitly noted otherwise. The different data cables may be identified by, e.g., writing on the jacket specifying the length of the data cable, a tag connected to the data cable near one or both ends, and/or by using different colors for the jacket based on the cable length.

In the illustrative embodiment, each data cable 1214-1220 is a passive optical cable (i.e., an optical cable that does not include electrical-to-optical and/or optical-to-electrical transceivers at one or both ends) and the network switch 1204 may employ silicon photonics (including silicon photonics integrated with silicon electronics on a single chip) to receive and generate optical signals to and from electrical signals for internal processing routing, and may employ optical multiplexers, photodiodes, and other silicon photonics components. Once converted to an electrical signal, the illustrative network switch 1204 may determine the destination of the received signal using standard routing techniques. In some embodiments, the data cables 1214-1220 may be electrical cables or active optical cables, and the network switch 1204 may employ an all-electrical signal processing and routing approach.

In the illustrative embodiment, each rack 302 and/or sled 204 may be defined to be part of one of the various zones 1206-1212 based on being a distance away from the network switch 1204 that is above a minimum threshold distance and/or below a maximum threshold distance. For example, in the illustrative embodiment, every rack 302 in the first zone 1206 is less than a threshold distance of 5 meters from the network switch 1204, every rack 302 in the second zone 1208 is more than a threshold distance of 5 meters but less than a threshold distance of 10 meters from the network switch 1204, every rack 302 in the third zone 1210 is more than a threshold distance of 10 meters but less than a threshold distance of 15 meters from the network switch 1204, and every rack 302 in the fourth zone 1212 is more than a threshold distance of 15 meters from the network switch 1204. Of course, different values may apply in different embodiments for a minimum or maximum threshold distance for any zone, such as any length between 1 and 50 meters. In the illustrative embodiments, the maximum threshold for one zone is the same as the minimum threshold for the next zone, so that ranges of data cable lengths associated with the various zones do not overlap and have no gaps between them. In some embodiments, the thresholds for the various zones may be such that the ranges of data cable lengths associated with the various zones overlap and/or have gaps between them. In the illustrative embodiment, the length of the data cable used to connect to all of the racks 302 in a given zone is at least the length of the threshold distance that defines the maximum extent of that zone. For example, the length of the first length data cable 1214 is at least 5 meters. Of course, the length of the data cables may be longer than the threshold distance defining the maximum extent of the zone, since the data cables may not be routed directly to the racks 302 and/or sleds 204 in a straight line, the data cables may need to travel vertically (i.e., up or down) at some point, and may otherwise need to be somewhat longer than the distance between the network switch 1204 and the rack 302 in a given zone that is farthest away. In some embodiments, a zone of a given rack 302 may be determined based on the shortest data cable (e.g., the shortest of the data cables 1214-1220) that can be used to connect the rack 302 to the network switch 1204, subject to any restrictions in how the data cables should be routed or organized in the data center 300. It should be appreciated that, in some embodiments, there may not be any indication that a rack 302 is part of a particular zone, other than which data cable is used to connect to that rack 302 (e.g., which of data cables 1214-1220).

It should be appreciated that, in some embodiments, the maximum length of the data cables 1214-1220 may depend on the particular type of data cable. For example, a particular type of high-bandwidth electrical data cable (e.g., a cable capable of carrying a 10 GHz signal) may have a maximum length of 10 meters due to signal loss, while a passive optical cable capable of carrying a signal with a similar digital bandwidth may have a maximum length of several hundred meters or longer.

In the illustrative embodiment, each zone has a large number of racks 302 in it, such as 256 racks 302. In some embodiments, each zone may have any number of racks 302 in it, such as any number from 1-1000, or more than, less than, or equal to 2, 5, 10, 20, 50, 100, 200, 500 or 1000 racks 302, and the number of racks 302 in any given zone may be the same as or different from the number of racks 302 in other zones.

In the illustrative embodiment, each data cable 1214-1220 runs from the network switch 1204 to a corresponding rack 302 and/or sled 204 as a separate data cable from any other data cable 1214-1220. In some embodiments, the data cables 1214-1220 that connect to the sleds 204 in the same rack 302 and/or to racks 302 in the same zone may be bundled together (such as with a jacket) at some point.

In the illustrative embodiment, the switching latency of the network switch 1204 is substantially the same for a signal sent from any sled 204 to any other sled 204 (i.e., the time between when the signal reaches the network switch 1204 from the source sled 204 and when the signal leaves the network switch 1204 to the destination sled 204 is substantially the same, regardless of the source sled 204 and destination sled 204). The switching latency may be any value capable of reaching the required performance levels, such as more than, less than, or equal to, 100 ns, 200 ns, 500 ns, 750 ns, 1,000 ns, 1,500 ns, or 2,000 ns. Of course, the overall latency for communication between any two sleds 204 may depend on the length of the particular data cables 1214-1220 used. In the illustrative embodiment, the latency in communicating between any two sleds 204 is less than 1,000 ns, even for the longest length data cable.

It should be appreciated that, in some embodiments, the data center 300 may include sleds 204 and racks 302 that are not directly connected to the network switch 1204. For example, the data center 300 may include several network switches 1204, with each network switch 1204 connected to a large number of sleds 204. The sleds 204 connected directly to the same network switch 1204 may be grouped together as a unit called a pod. The data center 300 may include any number of pods, such as any number from 1-1000 or more than, fewer than, or equal to 1, 2, 5, 10, 20, 50, 100, 200, 500 or 1,000 pods. The data center 300 may also include additional computational resources organized in a different manner from the pods described above. Of course, the various network switches 1204 of the data center 300 may all be connected to each other, allowing for communication between a first sled 204 connected to a first network switch 1204 and a second sled connected to a second network switch 1204 (although such communication may have a higher latency and/or lower bandwidth than communication between sleds 204 connected to the same network switch 1204).

In the illustrative embodiments, certain physical resources may be preferentially or exclusively placed in certain zones. For example, storage sleds may be preferentially or exclusively placed in the first zone 1206 in order to reduce latency to those storage sleds. The data center 300 may be arranged such that a certain type of physical resource (e.g., compute sleds, memory sleds, storage sleds, accelerator sleds, or other types of sled) outnumbers another type of physical resource (e.g., compute sleds, memory sleds, storage sleds, accelerator sleds, or other type of sled) in a given zone by a certain ratio, such as 3:2, 2:1, 5:1, 10:1, or 20:1. The data center 300 may also be arranged such that a given zone (such as the zone closest to the network switch 1204) may be composed of a certain portion of a certain type of physical resource (e.g., compute sleds, memory sleds, storage sleds, accelerator sleds, or other type of sled), such as more than, less than, or equal to 5%, 10%, 25%, 35%, 50%, 65%, 75%, 90%, 95%, or any other portion from 0-100%. In some embodiments, most or all of the sleds of a given type (e.g., compute sleds, memory sleds, storage sleds, accelerator sleds, or other sleds) may be placed in the same zone.

Referring now to FIGS. 13A and 13B (which illustrate the same embodiment from a front-facing and top-down view, respectively), an illustrative rack 302 of the data center 300 includes a top-of-rack switch 1302 to which the network switch 1202 is connected, such as with a first length data cable 1214. The rack 302 includes two support posts 1304 and several support arms 1306. It should be appreciated that, in some embodiments, a support post 1304 may support more than one rack 302 by being the left support post 1304 for one rack 302 and the right support post 1304 for the adjacent rack 302. Each pair of support arms 1306 that are the same distance from the ground form a sled space between them, into which a sled 204 may be inserted, but no sled 204 is shown in FIGS. 13A and 13B for the purpose of clarity.

Figure 13:
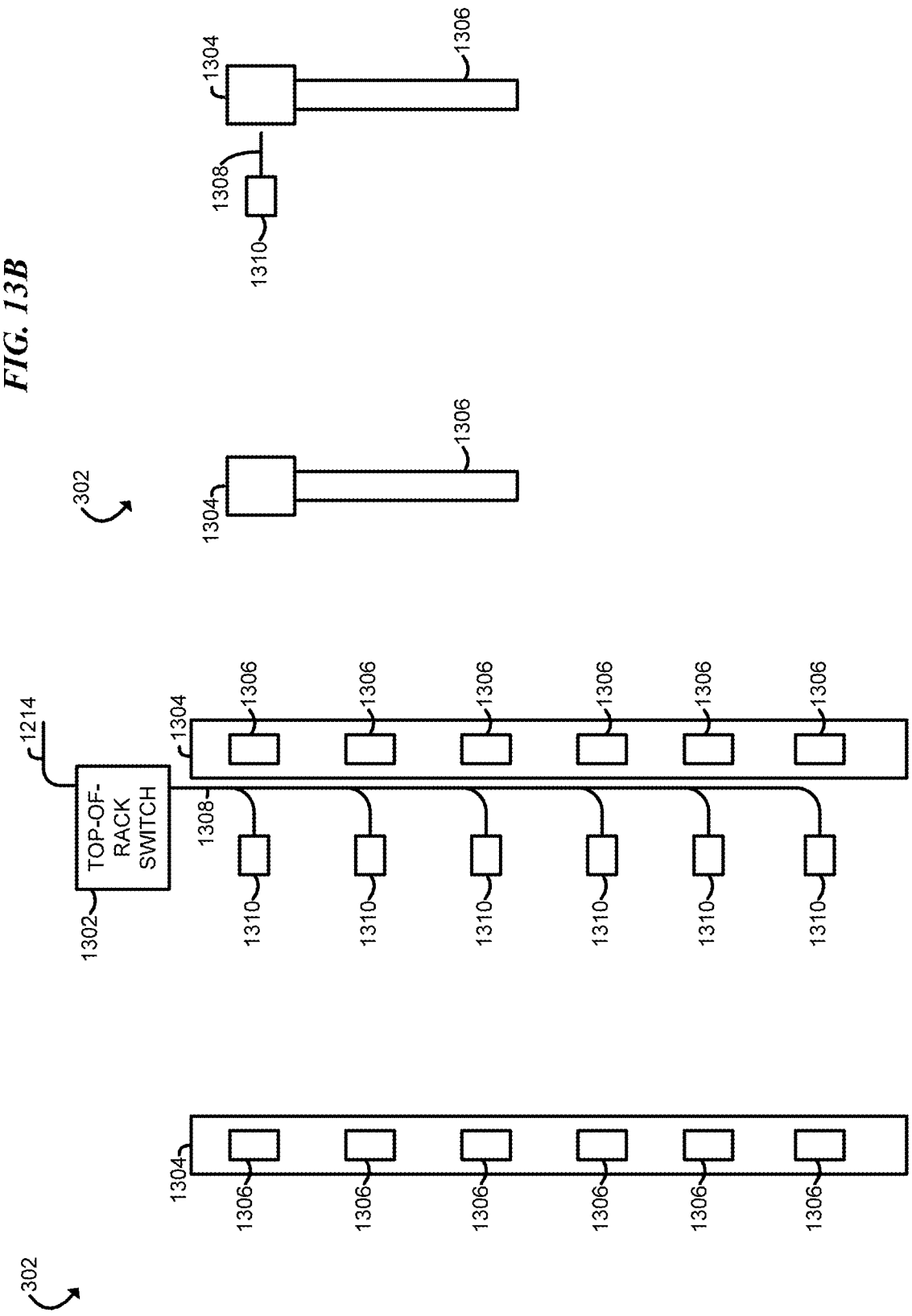
FIGS. 13A and 13B are a diagram of an example embodiment of a rack in the data center of FIG. 12 in which a data cable connects from a network switch to a top-of-rack switch.

A data cable 1308 runs from the top-of-rack switch 1302 to each sled space and ends with a connector 1310 which can mate with a corresponding component on the sled 204 to connect the sled 204 to the top-of-rack switch 1302. In the illustrative embodiment of FIG. 13, each data cable 1308 is an electrical cable and the first length data cable 1214 is an optical cable, but it should be appreciated that the data cable 1308 and/or the first length data cable 1214 may be an electrical cable or optical cable. As shown in the illustrative embodiment of FIGS. 13A and 13B, the data cables 1308 may run alongside the support post 1304. In some embodiments, the support posts 1304 may be hollow, allowing the data cables 1308 to be run inside of the support posts 1304. In the illustrative embodiments, each data cable 1308 that runs from the top-of-rack switch 1302 to a connector 1310 is a separate data cable, but, in some embodiments, some or all of the data cables 1308 running to different connectors 1310 in the same rack 302 may be bundled together in some way. Of course, not every component of the rack 302 is shown in FIGS. 13A and 13B, and the rack 302 may include additional elements such as mechanical support for the connectors 1310, power supplies, additional cables, etc.

Figure 14:
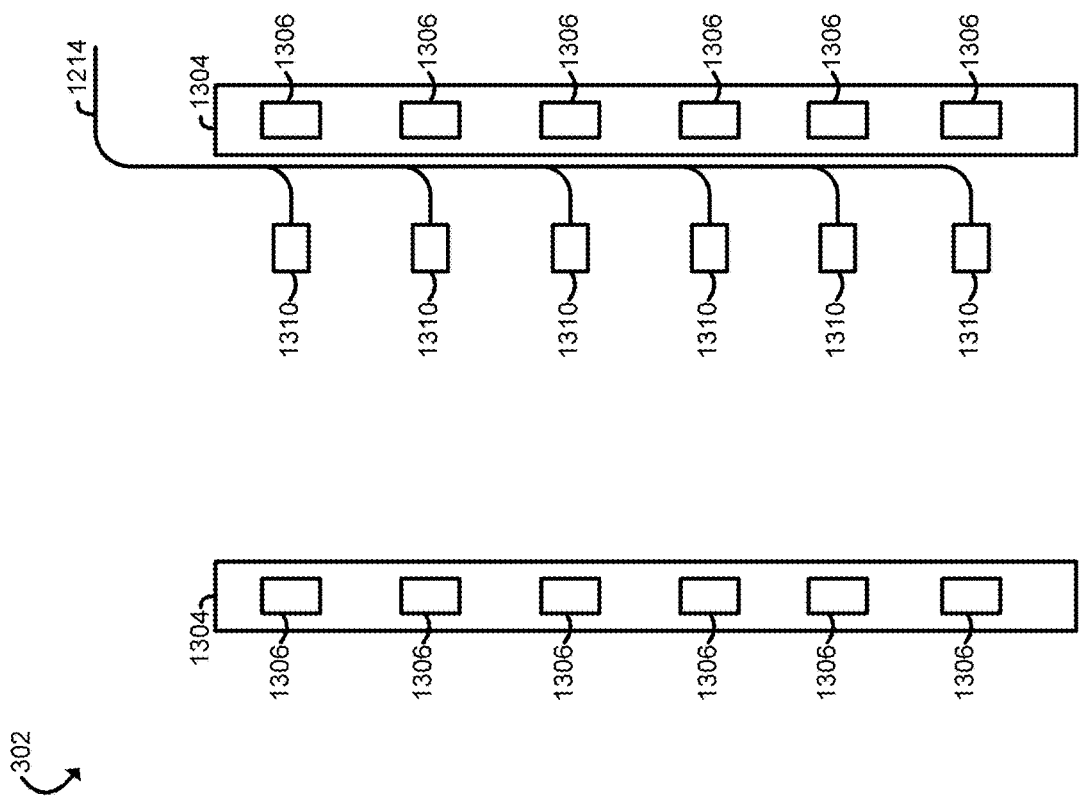
FIG. 14 is a diagram of an example embodiment of a data center in which data cables connect from a network switch directly to sleds of a rack and each data cable connecting to sleds in the same rack is the same length.

Referring now to FIG. 14, an illustrative rack 302 of the data center 300 includes two support posts 1304 and several support arms 1306, as in FIGS. 13A and 13B. FIG. 14 is a front-facing view, similar to FIG. 13A. The embodiment of the rack 302 shown in FIG. 14 does not include a top-of-rack switch, so the data cables coming from the network switch 1204 (such as a first length data cable 1214) are connected to the rack 302 by running directly to the sleds 204. In the embodiment shown in FIG. 14, each sled 204 in the same rack 302 is considered to be in the same zone and has the same length data cable running to the network switch 1204 (e.g., the first length data cable 1214). The data cables 1214 running from the various sleds 204 from a single rack 302 to the same network switch 1204 may or may not be bundled together in some manner.

Figure 15:
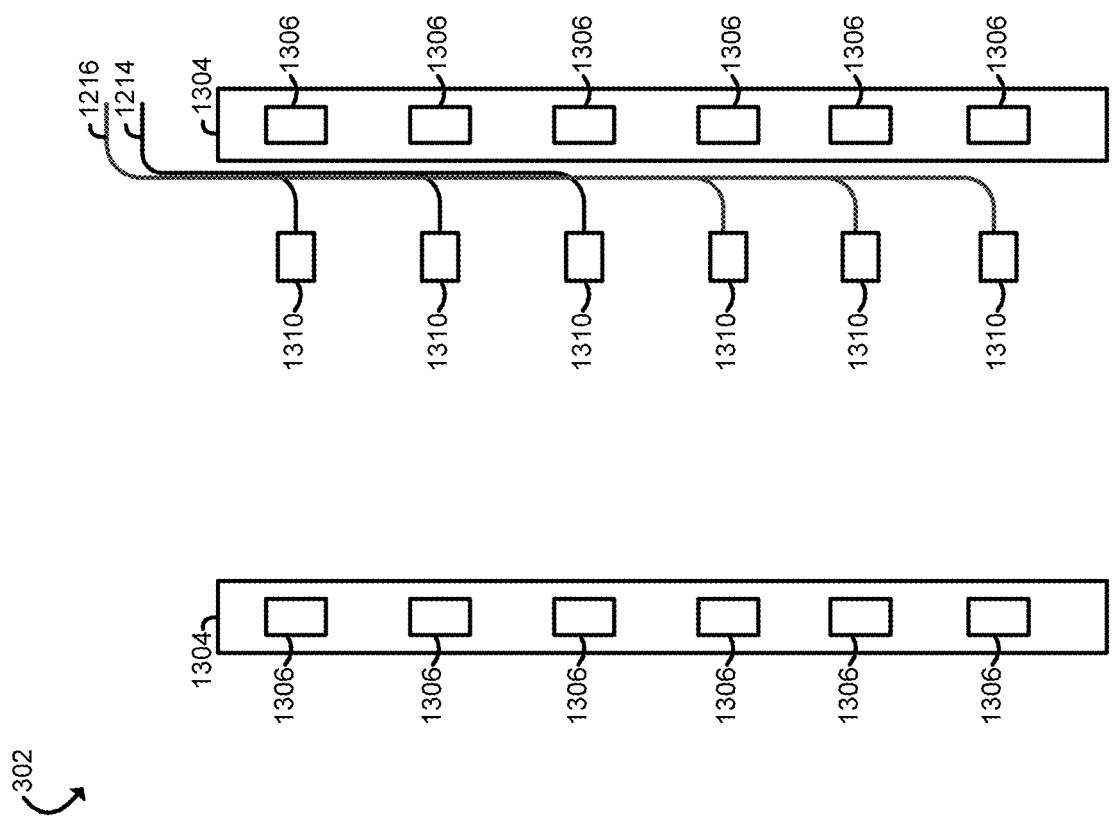
FIG. 15 is a diagram of an example embodiment of a data center in which data cables connect from a network switch directly to sleds of a rack and the length of each data cable connecting to sleds in the same rack may not be the same length.

Referring now to FIG. 15, an illustrative rack 302 of the data center 300 includes two support posts 1304 and several support arms 1306, as in FIGS. 13A and 13B. FIG. 15 is a front-facing view, similar to FIG. 13A. The embodiment of the rack 302 shown in FIG. 15, like in FIG. 14, does not include a top-of-rack switch, so the data cables coming from the network switch 1204 (such as a first length data cable 1214 or a second length data cable 1216) may run directly to the sleds 204. In the embodiment shown in FIG. 15, different sleds 204 in the same rack 302 may be in the different zones, and so some of the lower sleds 204 may be connected by a longer data cable (e.g., a second length data cable 1216) as compared to the data cables used for some of the higher sleds 204 (e.g., a first length data cable 1214). In the illustrative embodiment, all of the first length data cables 1214 and all of the second length data cables 1216 are separate, independent cables. In some embodiments, some or all of the first length data cables 1214 and the second length data cables 1216 running to the same rack 302 may be bundled together, such as all of the first length data cables 1214 running to connectors 1310 in the same rack 302 and all of the second length data cables 1216 running to connectors 1310 in the same rack 302.

Figure 16:
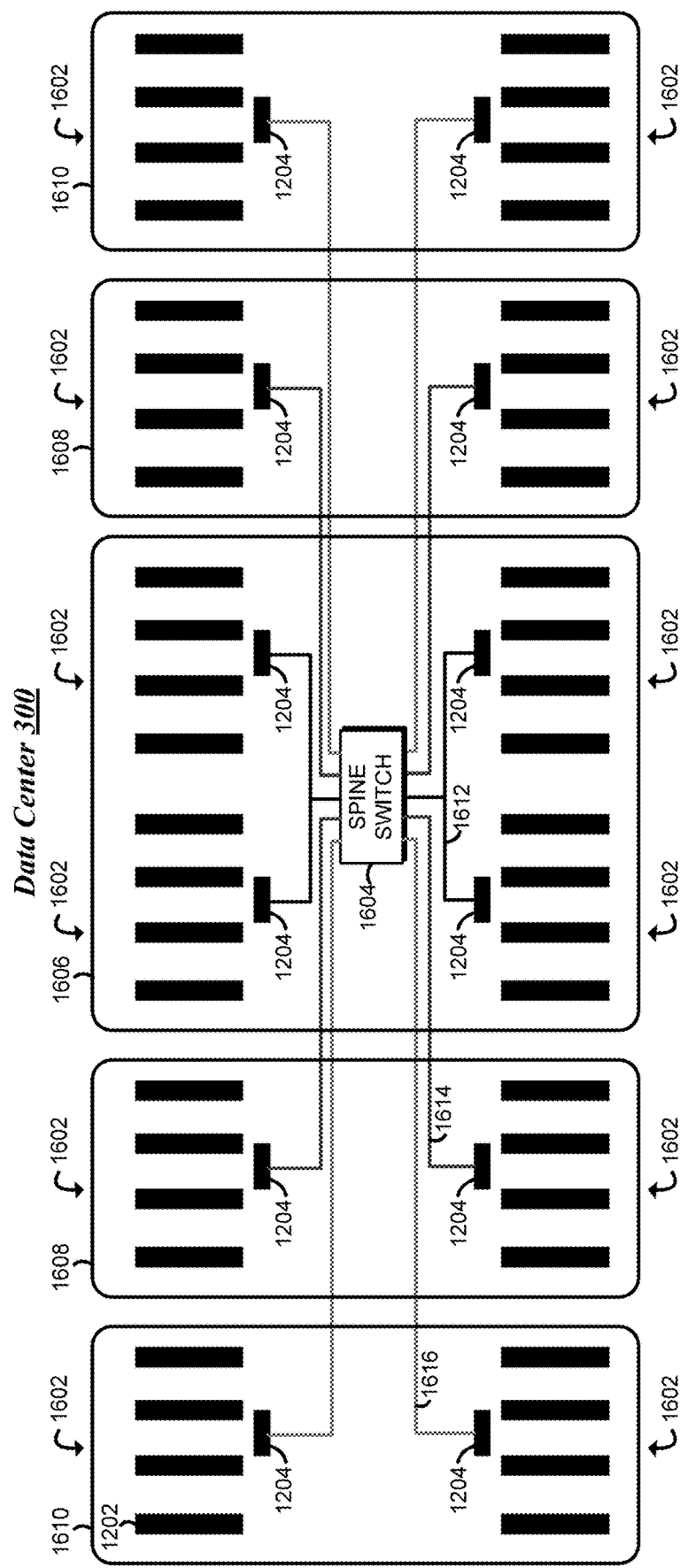
FIG. 16 is a diagram of an example embodiment of a data center in which the length of a data cable used to connect a network switch to a spine switch depends on a zone of the network switch.

Referring now to FIG. 16, an illustrative data center 300 may include several pods 1602 connected together through one or more spine switches 1604. As described above, a pod 1602 includes all of the racks 302 and sleds 204 that are connected together with a single network switch 1204 (with or without intermediate top-of-rack switches 1302 as shown in FIG. 13 and FIGS. 14 & 15, respectively). Each pod 1602 includes several rows 1202 of racks 302. Only one row 1202 is labeled in FIG. 16 in the interest of clarity, but each unlabeled solid black rectangle represents a row 1202. Similar to how racks 302 are grouped into zones in FIG. 12, the pods 1602 in FIG. 16 are grouped into zones based on a distance from the network switch 1204 to the spine switch 1604.

The pods 1602 of FIG. 16 are grouped into a first zone 1606, a second zone 1608, and a third zone 1610. A data cable of the same length is used to connect the spine switch 1604 to each network switch 1204 in the same zone. As shown in FIG. 16, a first length data cable 1612 is used to connect the pods 1602 in the first zone 1606, a second length data cable 1614 is used to connect the pods 1602 in the second zone 1608, and a third length data cable 1616 is used to connect the pods 1602 in the third zone 1610. Each data cable of the same shade is the same type, but not every data cable in FIG. 16 is labeled in the interest of clarity. It should be appreciated that each data cable of a given type (e.g., each first length data cable 1612) is approximately the same length. Each data cable 1612-1616 may be an electrical cable (e.g., copper cable) or optical cable. In the illustrative embodiment, each data cable 1612-1616 is a passive optical cable. The spine switch 1604 may use a similar switching technology as the network switch 1204 (i.e., the spine switch 1604 may employ silicon photonics to interface with optical signals or may use all-electrical signal processing and routing).

In the illustrative embodiment, each pod 1602 may be defined to be part of one of the various zones 1606-1610 based on the corresponding network switch 1204 being a distance away from the spine switch 1604 that is above a minimum threshold distance and/or below a maximum threshold distance. For example, in the illustrative embodiment, every network switch 1204 in the first zone 1606 is less than a threshold distance of 20 meters from the spine switch 1604, every network switch 1204 in the second zone 1608 is more than a threshold distance of 20 meters but less than a threshold distance of 60 meters from the spine switch 1604, and every network switch 1204 in the third zone 1610 is more than a threshold distance of 60 meters but less than a threshold distance of 100 meters from the spine switch 1604.

Of course, different values may apply in different embodiments for a minimum or maximum threshold distance for any zone, such as any length between 1 and 500 meters. In the illustrative embodiments, the maximum threshold for one zone is the same as the minimum threshold for the next zone, so that ranges of data cable lengths associated with the various zones do not overlap and have no gaps between them. In some embodiments, the thresholds for the various zones may be such that the ranges of data cable lengths associated with the various zones overlap and/or have gaps between them. In the illustrative embodiment, the length of the data cable used to connect to all of the network switches 1204 in a given zone is at least the length of the threshold distance that defines the maximum extent of that zone. For example, the length of the first length data cable 1612 is at least 20 meters. Of course, the length of the data cables may be longer than the threshold distance defining the maximum extent of the zone, since the data cables may not be routed directly to the network switches 1204 in a straight line, the data cables may need to travel vertically (i.e., up or down) at some point, and may otherwise need to be somewhat longer than the distance between the spine switch 1604 and the network switch 1204 in a given zone that is farthest away. In some embodiments, a zone of a given network switch 1204 may be determined based on the shortest data cable (e.g., the shortest of the data cables 1214-1220) that can be used to connect the network switch 1204 to the spine switch 1204, subject to any restrictions in how the data cables should be routed or organized in the data center 300. It should be appreciated that, in some embodiments, there may not be any indication that a pod 1602 is part of a particular zone, other than which data cable is used to connect to the corresponding network switch 1204 (e.g., which of data cables 1612-1616).

It should be appreciated that, in some embodiments, the maximum length of the data cables 1612-1616 may depend on the particular type of data cable. For example, a particular type of high-bandwidth electrical data cable (e.g., a cable capable of carrying a 10 GHz signal) may have a maximum length of 10 meters due to signal loss, while a passive optical cable capable of carrying a signal with a similar digital bandwidth may have a maximum length of several hundred meters or longer.

Figure 17:
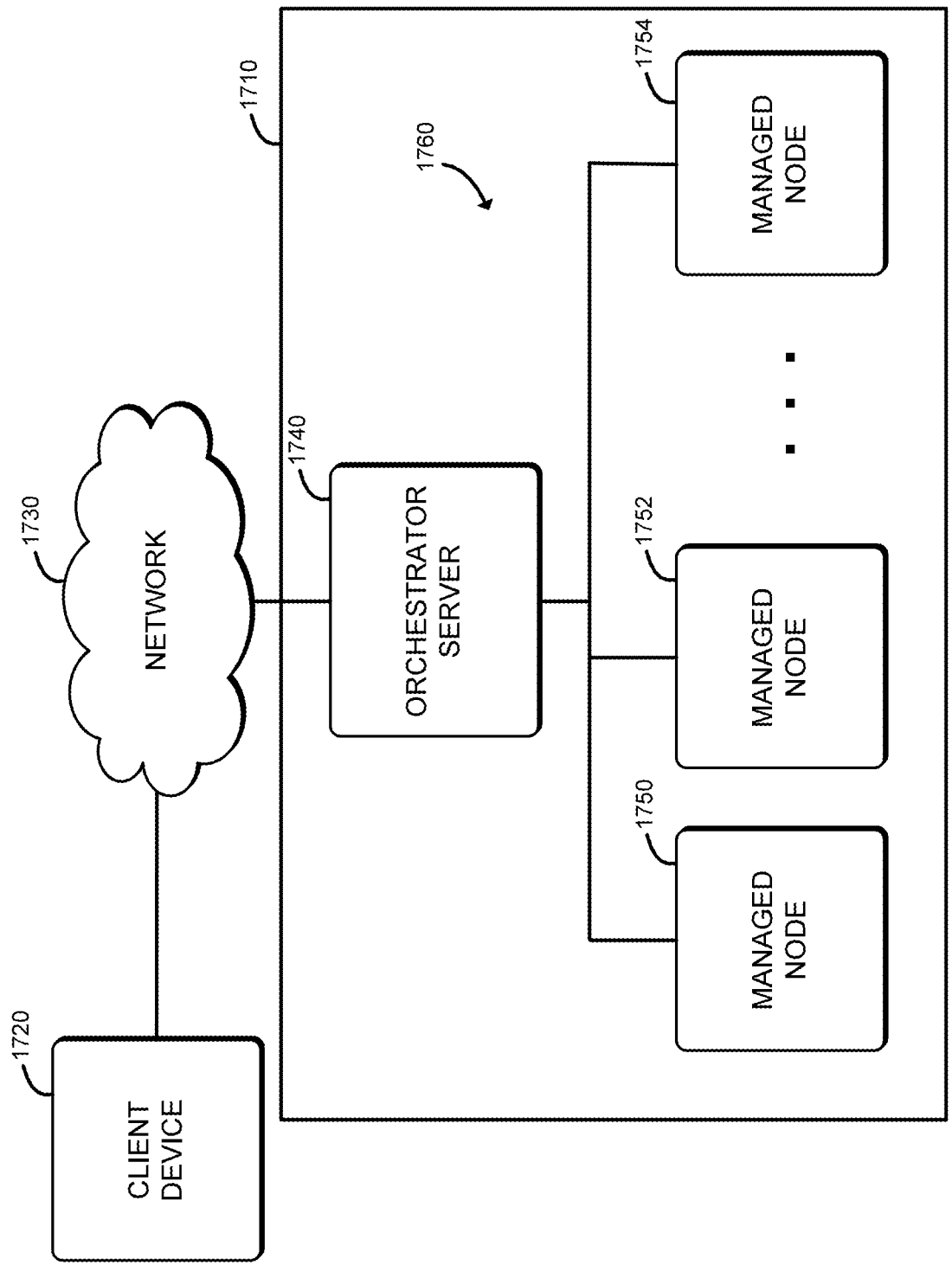
FIG. 17 is a simplified block diagram of at least one embodiment of a system for orchestrating workloads assigned in a data center.

As shown in FIG. 17, an illustrative system 1710 for orchestrating workloads assigned in a data center includes an orchestrator server 1740 in communication with a set of managed nodes 1760. In the illustrative embodiment, the set of managed nodes 1760 includes managed nodes 1750, 1752, and 154. While three managed nodes 1760 are shown for simplicity, it should be understood that, in the illustrative embodiment the set includes many more managed nodes 1760 (e.g., tens of thousands of managed nodes 1760). The system 1710 may be located in a data center 300 and provide storage and compute services (e.g., cloud services) to a client device 1720 that is in communication with the system 1710 through a network 1730. The orchestrator server 1740 may support a cloud operating environment, such as OpenStack, and the managed nodes 1760 may execute one or more applications or processes (i.e., workloads), such as in virtual machines or containers, on behalf of a user of the client device 1720. As discussed in more detail herein, the orchestrator server 1740, in operation, is configured to receive availability data from each managed node 1760. The availability data may be embodied as any data indicative of the ability of the corresponding managed node to receive and execute a workload in addition to any workloads the managed node 1760 is presently executing. After receiving the availability data, which is generated by the managed nodes 1760, the orchestrator server 1740 performs analytics to determine how to assign or reassign workloads among the managed nodes 1760 that reported themselves as being available in the availability data. As such, in the illustrative embodiment, the orchestrator server 1740 focuses the data analytics for determining workload assignments and reassignments to the limited set of available managed nodes 1760, thereby enabling the orchestrator server 1740 to operate more efficiently.

Figure 18:
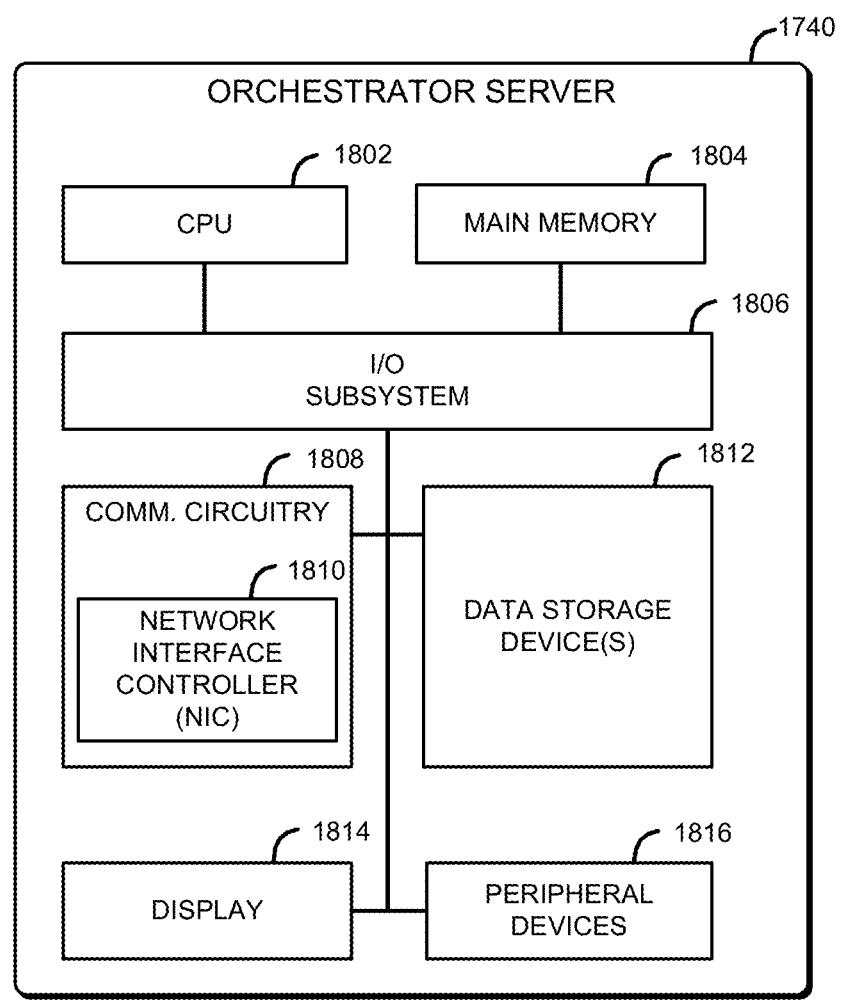
FIG. 18 is a simplified block diagram of at least one embodiment of an orchestrator server of the system of FIG. 17.

Referring now to FIG. 18, the orchestrator server 1740 may be embodied as any type of compute device capable of performing the functions described herein, including issuing a request to have cloud services performed, receiving results of the cloud services, assigning workloads to managed nodes 1760, analyzing telemetry data indicative of performance and conditions (e.g., resource utilization, one or more temperatures, fan speeds, etc.) as the workloads are executed, and adjusting the assignments of the workloads to increase resource utilization as the workloads are performed. For example, the orchestrator server 1740 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 18, the illustrative orchestrator server 1740 includes a central processing unit (CPU) 1802, a main memory 1804, an input/output (I/O) subsystem 1806, communication circuitry 1808, and one or more data storage devices 1812. Of course, in other embodiments, the orchestrator server 1740 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1804, or portions thereof, may be incorporated in the CPU 1802.

The CPU 1802 may be embodied as any type of processor capable of performing the functions described herein. The CPU 1802 may be embodied as a single or multi-core processor(s), a microcontroller, or other processor or processing/controlling circuit. In some embodiments, the CPU 1802 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 1804 may be embodied as any type of volatile (e.g., dynamic random access memory (DRAM), etc.) or non-volatile memory or data storage capable of performing the functions described herein. In some embodiments, all or a portion of the main memory 1804 may be integrated into the CPU 1802. In operation, the main memory 1804 may store various software and data used during operation such as availability data, telemetry data, policy data, workload labels, workload classifications, workload adjustment data, operating systems, applications, programs, libraries, and drivers.

The I/O subsystem 1806 may be embodied as circuitry and/or components to facilitate input/output operations with the CPU 1802, the main memory 1802, and other components of the orchestrator server 1740. For example, the I/O subsystem 1806 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1806 may form a portion of a system-on-a-chip (SoC) and be incorporated, along with one or more of the CPU 1802, the main memory 1804, and other components of the orchestrator server 1740, on a single integrated circuit chip.

The communication circuitry 1808 may be embodied as any communication circuit, device, or collection thereof, capable of enabling communications over the network 1730 between the orchestrator server 1740 and another compute device (e.g., the client device 1720 and/or the managed nodes 1760). The communication circuitry 1808 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1808 includes a network interface controller (NIC) 1810, which may also be referred to as a host fabric interface (HFI). The NIC 1810 may be embodied as one or more add-in-boards, daughtercards, network interface cards, controller chips, chipsets, or other devices that may be used by the orchestrator server 1740 to connect with another compute device (e.g., a managed node 1760 or the client device 1720). In some embodiments, the NIC 1810 may be embodied as part of a system-on-a-chip (SoC) that includes one or more processors, or included on a multichip package that also contains one or more processors. In some embodiments, the NIC 1810 may include a local processor (not shown) and/or a local memory (not shown) that are both local to the NIC 1810. In such embodiments, the local processor of the NIC 1810 may be capable of performing one or more of the functions of the CPU 1802 described herein. Additionally or alternatively, in such embodiments, the local memory of the NIC 1810 may be integrated into one or more components of the orchestrator server 1740 at the board level, socket level, chip level, and/or other levels.

The one or more illustrative data storage devices 1812, may be embodied as any type of devices configured for short-term or long-term storage of data such as, for example, memory devices and circuits, memory cards, hard disk drives, solid-state drives, or other data storage devices. Each data storage device 1812 may include a system partition that stores data and firmware code for the data storage device 1812. Each data storage device 1812 may also include an operating system partition that stores data files and executables for an operating system.

Additionally, the orchestrator server 1740 may include a display 1814. The display 1814 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1814 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the orchestrator server 1740 may include one or more peripheral devices 1816. Such peripheral devices 1816 may include any type of peripheral device commonly found in a compute device such as speakers, a mouse, a keyboard, and/or other input/output devices, interface devices, and/or other peripheral devices.

The client device 1720 may have components similar to those described in FIG. 18. The description of those components of the orchestrator server 1740 is equally applicable to the description of components of the client device 1720 and is not repeated herein for clarity of the description. In the illustrative embodiment, each of the managed nodes 1760 may be embodied as a sled 204 in a rack 304 of the data center 300. In other embodiments, each of the managed nodes 1760 may have components similar to those described in FIG. 18, like the client device 1720. Further, it should be appreciated that any of the client device 1720 and the managed nodes 1760 may include other components, subcomponents, and devices commonly found in a computing device, which are not discussed above in reference to the orchestrator server 1740 and not discussed herein for clarity of the description.

As described above, the client device 1720, the orchestrator server 1740 and the managed nodes 1760 are illustratively in communication via the network 1730, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 19:
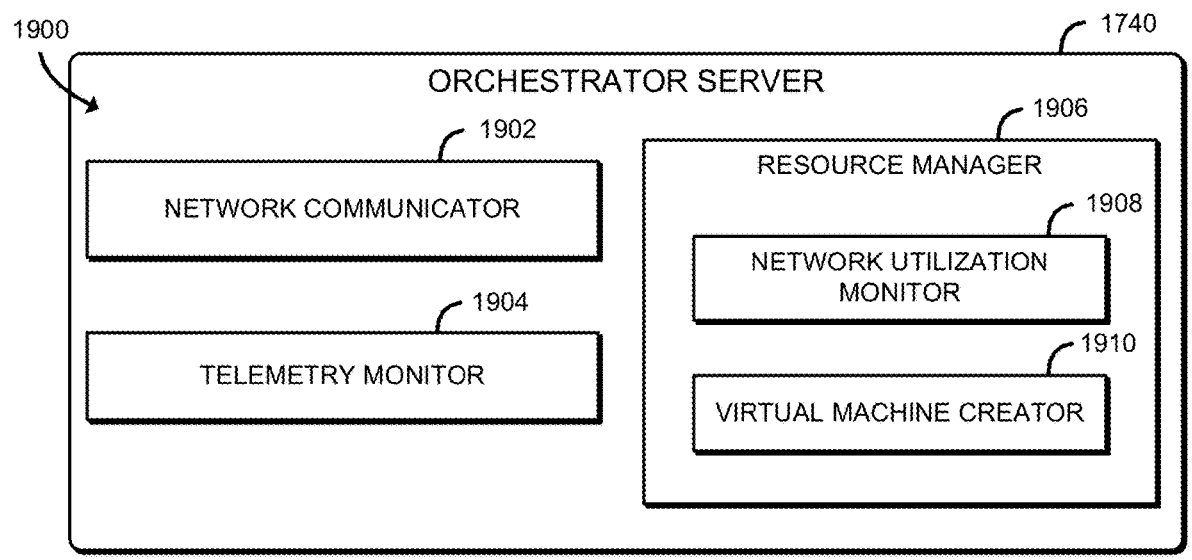
FIG. 19 is a simplified block diagram of at least one embodiment of an environment that may be established by the orchestrator server of FIG. 18.

Referring now to FIG. 19, in the illustrative embodiment, the orchestrator server 1740 may establish an environment 1900 during operation. The illustrative environment 1900 includes a network communicator 1902, a telemetry monitor 1904, a policy manager 1940, and a resource manager 1906. Each of the components of the environment 1900 may be embodied as hardware, firmware, software, or a combination thereof. As such, in some embodiments, one or more of the components of the environment 1900 may be embodied as circuitry or a collection of electrical devices (e.g., network communicator circuitry 1902, telemetry monitor circuitry 1904, resource manager circuitry 1906, etc.). It should be appreciated that, in such embodiments, one or more of the network communicator circuitry 1902, telemetry monitor circuitry 1904, or resource manager circuitry 1906 may form a portion of one or more of the CPU 1804, the main memory 1806, the I/O subsystem 1810, and/or other components of the orchestrator server 1740.

In the illustrative environment 1900, the network communicator 1902, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1740, respectively. To do so, the network communicator 1902 is configured to receive and process data packets from one system or computing device (e.g., the client device 1720) and to prepare and send data packets to another computing device or system (e.g., the managed nodes 1760). Accordingly, in some embodiments, at least a portion of the functionality of the network communicator 1902 may be performed by the communication circuitry 1810, and, in the illustrative embodiment, by the NIC 1810.

The telemetry monitor 1904, which may be embodied as hardware, firmware, software, virtualized hardware, emulated architecture, and/or a combination thereof as discussed above, is configured to collect status data (e.g., telemetry data 1902 and managed node availability data 1917) from the managed nodes 1760 as the managed nodes 1760 execute the workloads assigned to them. The telemetry monitor 1904 may actively poll each of the managed nodes 1760 for updated status data on an ongoing basis or may passively receive the status data from the managed nodes 1760, such as by listening on a particular network port for updated status data. The telemetry monitor 1904 may further parse and categorize the status data, such as by separating the status data into an individual file or data set for each managed node 1760.

The resource manager 1906, which may be embodied as hardware, firmware, software, virtualized hardware, emulated architecture, and/or a combination thereof, is configured to generate data analytics from the telemetry data 1902, identify the workloads, classify the workloads, identify trends in the resource utilization of the workloads, predict future resource utilizations of the workloads, and adjust the assignments of the workloads to the managed nodes 1760 and the settings of the managed nodes 1760 to increase the resource utilization. The resource manager 1906 includes a network utilization monitor 1908, which may identify workloads that would benefit from low-latency communication between various sleds 204, and move those identified workloads to low-latency sleds 204 (i.e., to sleds in zones close to the network switch 1202. The resource manager 1906 may also include a virtual machine creator 1910, which is configured to receive requests for creation of virtual machines (such as from a client device 1720 through the network communicator 1902) which may specify whether or not a low-latency virtual machine is required. The virtual machine creator 1910 may then create a virtual machine using physical resources (e.g., sleds 204 and managed nodes 1760) with a latency corresponding to the request.

Figure 20:
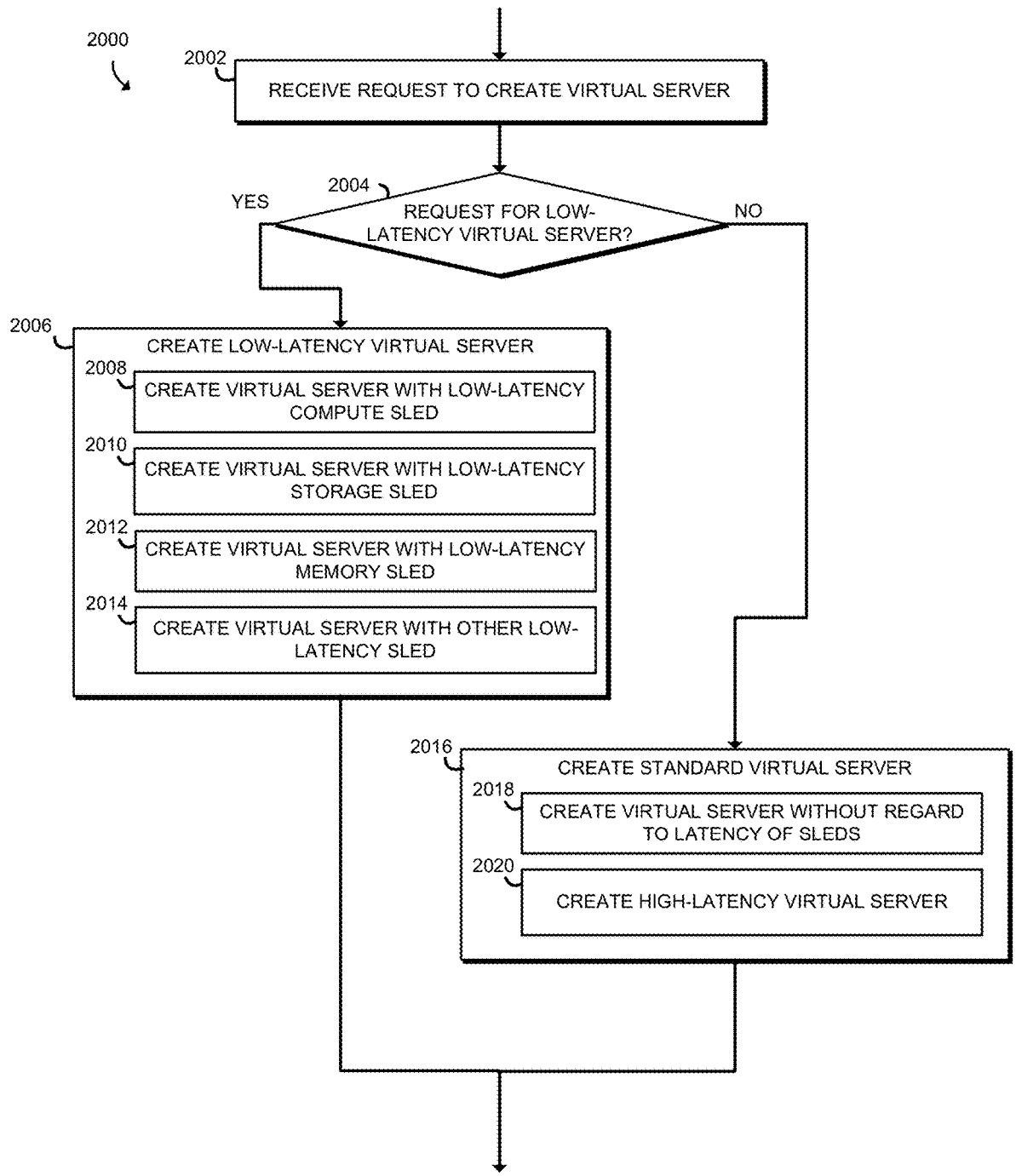
FIG. 20 is at least one embodiment of a flowchart of a method for creating a virtual server that may be executed by the orchestrator server of FIG. 18.

Referring now to FIG. 20, in use, the orchestrator 1740 may execute a method 2000 for creating a virtual server. As described above, each zone has a different cable length associated with it and, as such, may have a different latency. The orchestrator 1740 may create low-latency virtual servers by assigning resources of racks located in zones which use short cables, such as the first zone 1206. The method 2000 begins in block 2002, in which the orchestrator server 2002 receives a request to create a virtual server, which may be a request to create a low-latency virtual server. If the received request is a request for a low-latency virtual server, the method 2000 in block 2004 proceeds to block 2006. In block 2006, the orchestrator server 1740 creates a low-latency virtual server by creating a virtual server with one or more physical resources in a low-latency zone, such as the first zone 1206 shown in FIG. 12. The orchestrator server 1740 may create the virtual server with a low-latency compute sled in block 2008, with a low-latency storage sled in block 2010, with a low-latency memory sled in block 2012, and/or with another low-latency sled in block 2010, such as an accelerator sled.

Referring back to block 2004, if the received request is not a request for a low-latency virtual server, the method 2000 in block 2004 proceeds to block 2016. In block 2016, the orchestrator server 1740 creates a standard virtual server. The orchestrator server 1740 may create a standard virtual server by creating a virtual server without regard to latency of the sleds 204 composing the virtual server in block 2018 or may create a standard virtual server by creating a high-latency virtual server by creating a virtual server with sleds 204 that have a high latency.

Figure 21:
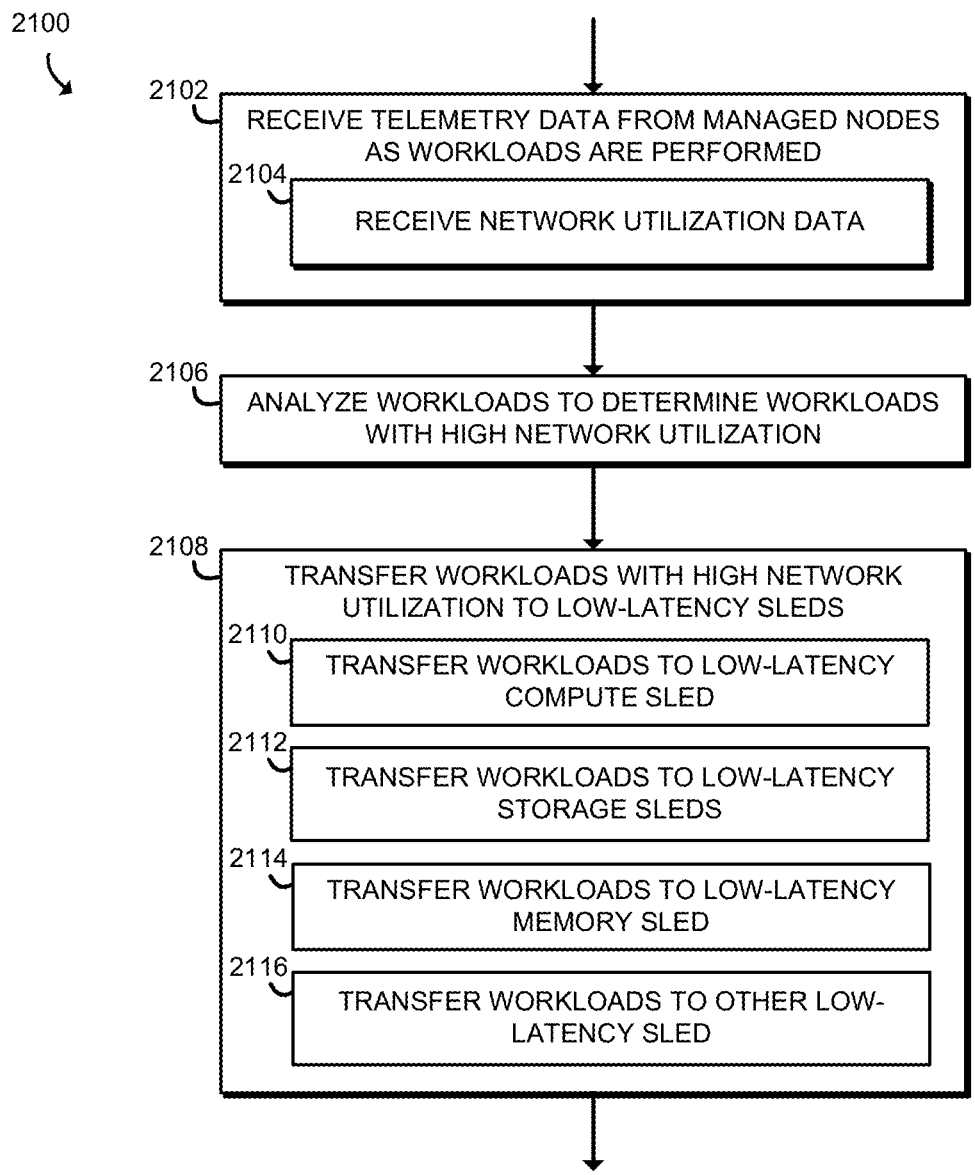
FIG. 21 is at least one embodiment of a flowchart of a method for managing workloads that may be executed by the orchestrator server of FIG. 18.

Referring now to FIG. 21, in use, the orchestrator server 1740 may execute a method 2100 for managing workloads of the data center 300. The method 2100 begins in block 2102, in which the orchestrator server 1740 receives telemetry data from the managed nodes as workloads are performed. The orchestrator server 1740 may receive network utilization data in block 2104 and, in block 2106, may analyze the workloads to determine which workloads have a high network utilization.

In block 2108, the orchestrator server 1740 may transfer workloads with high network utilization to low-latency sleds, such as by transferring workloads to a low-latency compute sled in block 2110, to a low-latency storage sled in block 2112, a low-latency memory sled in block 2114, and/or to another low-latency sled in block 2216, such as an accelerator sled. It should be appreciated that, as part of transferring workloads with high network utilization to low-latency sleds, the orchestrator server 1740 may also similarly transfer workloads with low network utilization to high-latency sleds.

EXAMPLES

Illustrative examples of the devices, systems, and methods disclosed herein are provided below. An embodiment of the devices, systems, and methods may include any one or more, and any combination of, the examples described below.

Example 1 includes a data center comprising a network switch; a plurality of racks, wherein each rack of the plurality of racks is located in a corresponding zone of a plurality of zones, wherein each zone of the plurality of zones is associated with a minimum threshold distance and a maximum threshold distance that define a distance range, wherein no two distance ranges of the plurality of zones overlap with each other, and wherein each rack of the plurality of racks is defined as located in a zone of the plurality of zones if the distance from the network switch to the corresponding rack is above the minimum threshold distance associated with the corresponding zone and below a maximum threshold distance associated with the corresponding zone; and a plurality of data cables, wherein each rack of the plurality of racks is connected to the network switch with one of the data cables of the plurality of data cables and wherein each data cable of the plurality of data cables that is connected to a corresponding rack located in the same zone has approximately the same length.

Example 2 includes the subject matter of Example 1, and wherein each rack of the plurality of racks comprises a plurality of sleds, wherein each data cable of the plurality of data cables is connected directly to a sled of the plurality of sleds of a rack of the plurality of racks.

Example 3 includes the subject matter of any of Examples 1 and 2, and wherein each data cable of the plurality of data cables is a passive optical cable.

Example 4 includes the subject matter of any of Examples 1-3, and further including at least 256 sleds, wherein each of the at least 256 sleds is included in a rack of the plurality of racks.

Example 5 includes the subject matter of any of Examples 1-4, and further including at least 1,024 sleds, wherein each of the at least 1,024 sleds is included in a rack of the plurality of racks.

Example 6 includes the subject matter of any of Examples 1-5, and wherein each data cable of the plurality of data cables is connected to a top-of-rack switch of a rack of the plurality of racks.

Example 7 includes the subject matter of any of Examples 1-6, and wherein each data cable of the plurality of data cables is the same color as each other data cable of the plurality of data cables that is approximately the same length as the corresponding data cable and is a different color from each other data cable of the plurality of data cables that is not approximately the same length as the corresponding data cable.

Example 8 includes the subject matter of any of Examples 1-7, and further including at least 256 sleds, wherein each of the 256 sleds is included in a rack of the plurality of racks, wherein each rack connected to the network switch is in a zone of the plurality of zones, wherein the plurality of zones comprises at most 4 zones.

Example 9 includes the subject matter of any of Examples 1-8, and further including a plurality of sleds, wherein each sled of the plurality of sleds is included in a rack of the plurality of racks, wherein at least half of the sleds in the zone closest to the network switch are storage sleds.

Example 10 includes a data center comprising a spine switch; a plurality of pods, each pod of the plurality of pods comprising a plurality of racks and a network switch, wherein each rack of a plurality of racks of a pod of the plurality of pods is connected to the corresponding network switch and wherein each pod of the plurality of pods is located in a corresponding zone of a plurality of zones, wherein each zone of the plurality of zones is associated with a minimum threshold distance and a maximum threshold distance that define a distance range, wherein no two distance ranges of the plurality of zones overlap with each other, and wherein each pod of the plurality of pods is defined as located in a zone of the plurality of zones if the distance from the spine switch to the corresponding network switch is above the minimum threshold distance associated with the corresponding zone and below a maximum threshold distance associated with the corresponding zone; and a plurality of data cables, wherein each network switch of the plurality of pods is connected to the spine switch with one of the data cables of the plurality of data cables and wherein each data cable of the plurality of data cables that is connected to a corresponding network switch located in the same zone has approximately the same length.

Example 11 includes the subject matter of Example 10, and wherein each data cable of the plurality of data cables is a passive optical cable.

Example 12 includes the subject matter of any of Examples 10 and 11, and wherein each data cable of the plurality of data cables is the same color as each other data cable of the plurality of data cables that is approximately the same length as the corresponding data cable and is a different color from each other data cable of the plurality of data cables that is not approximately the same length as the corresponding data cable.

Example 13 includes the subject matter of any of Examples 10-12, and wherein the plurality of pods comprises at least 32 pods, wherein each network switch of a pod of the plurality of pods connected to the spine switch is in a zone of the plurality of zones, wherein the plurality of zones comprises at most 4 zones.

Example 14 includes an orchestrator server for managing resources of a data center, the orchestrator server comprising one or more processors; one or more memory devices having stored therein a plurality of instructions that, when executed by the one or more processors, causes the orchestrator server to receive a request for creation of a low-latency virtual machine; and select, in response to the request for creation of the low-latency virtual machine, one or more sleds of the data center in a low-latency zone, wherein each sled in the low-latency zone is connected to the same network switch via a corresponding data cable of a plurality of data cables, wherein each data cable of the plurality of data cables has a length shorter than or approximately equal to the length of each other data cable of the plurality of data cables connected to the same network switch; and create, in response to the request for creation of the low-latency virtual machine, the low-latency virtual machine with use of the one or more sleds.

Example 15 includes the subject matter of Example 14, and wherein the one or more sleds comprises a storage sled.

Example 16 includes the subject matter of any of Examples 14 and 15, and wherein the low latency zone comprises at least 128 sleds.

Example 17 includes the subject matter of any of Examples 14-16, and wherein the plurality of instructions further cause the compute device to receive network utilization data of a plurality of workloads of the data center; analyze the plurality of workloads based on the network utilization data to determine one or more workloads with high network utilization; and transfer the one or more workloads with high network utilization to one or more additional sleds in the low-latency zone.

Example 18 includes a method for configuring a data center, the method comprising determining a length from each rack of a plurality of racks to a network switch of the data center; assigning each rack of the plurality of racks to a zone of a plurality of zones associated with the network switch based on a determination that the corresponding distance from the rack to the network switch is above a minimum threshold distance associated with the assigned zone and below a maximum threshold distance associated with the assigned zone; selecting, for each rack of the plurality of racks, a length of a data cable to connect the rack to the network switch based on the assigned zone; and connecting, for each rack of the plurality of racks, a data cable with the selected length from the rack to the network switch, wherein the length selected for each data cable is approximately the same as the length of each other data cable selected for each rack of the plurality of racks assigned to the same zone.

Example 19 includes the subject matter of Example 18, and wherein each rack of the plurality of racks comprises a plurality of sleds, wherein each data cable connected to a rack of the plurality of racks is connected directly to a sled of the plurality of sleds of a rack of the plurality of racks.

Example 20 includes the subject matter of any of Examples 18 and 19, and wherein each data cable of the plurality of data cables is a passive optical cable.

Example 21 includes the subject matter of any of Examples 18-20, and wherein connecting the data cable with the selected length from the rack to the network switch comprises connecting at least 256 sleds, wherein each of the at least 256 sleds is included in a rack of the plurality of racks.

Example 22 includes the subject matter of any of Examples 18-21, and wherein connecting the data cable with the selected length from the rack to the network switch comprises connecting at least 1,024 sleds, wherein each of the at least 1,024 sleds is included in a rack of the plurality of racks.

Example 23 includes the subject matter of any of Examples 18-22, and wherein connecting the data cable with the selected length from the rack to the network switch comprises connecting the data cable to a top-of-rack switch of the corresponding rack.

Example 24 includes the subject matter of any of Examples 18-23, and wherein each data cable connected to a rack of the plurality of racks is the same color as each other data cable connected to a rack of the plurality of racks that is approximately the same length as the data cable and is a different color from each other data cable connected to a rack of the plurality of racks that is not approximately the same length as the data cable.

Example 25 includes the subject matter of any of Examples 18-24, and wherein the plurality of racks comprises at least 32 racks and wherein the plurality of zones comprises at most 4 zones.

Example 26 includes the subject matter of any of Examples 18-25, and wherein each rack of the data center comprises a plurality of sled spaces, further comprising inserting a storage sled to at least half of the sled spaces of the racks assigned to a zone closest to the network switch.

Example 27 includes a method for configuring a data center, the method comprising determining a length from each network switch of a plurality of network switches to a spine switch of the data center, wherein each network switch of the plurality of network switches is associated with a different pod comprising a plurality of racks; assigning each network switch of the plurality of network switches to a zone of a plurality of zones associated with the spine switch based on a determination that the corresponding distance from the network switch to the spine switch is above a minimum threshold associated with the assigned zone and below a maximum threshold associated with the assigned zone; selecting, for each network switch of the plurality of network switches, a length of a data cable to connect the network switch to the spine switch based on the assigned zone; and connecting, for each network switch of the plurality of network switches, a data cable with the selected length from the network switch to the spine switch, wherein the length selected for each data cable is approximately the same as the length of each other data cable selected for each network switch of the plurality of network switches assigned to the same zone.

Example 28 includes the subject matter of Example 27, and wherein each data cable of the plurality of data cables is a passive optical cable.

Example 29 includes the subject matter of any of Examples 27 and 28, and wherein each data cable connected to a network switch of the plurality of network switches is the same color as each other data cable connected to a network switch of the plurality of network switches that is approximately the same length as the data cable and is a different color from each other data cable connected to a rack of the plurality of racks that is not approximately the same length as the data cable.

Example 30 includes the subject matter of any of Examples 27-29, and wherein the plurality of pods comprises at least 32 pods and wherein the plurality of zones comprises at most 4 zones.

Example 31 includes a method for managing resources of a data center with an orchestrator server, the method comprising receiving, by the orchestrator server, a request for creation of a low-latency virtual machine; selecting, by the orchestrator server and in response to the request for creation of the low-latency virtual machine, one or more sleds of the data center in a low-latency zone, wherein each sled in the low-latency zone is connected to the same network switch via a corresponding data cable of a plurality of data cables, wherein each data cable of the plurality of data cables has a length shorter than or approximately equal to the length of each other data cable of the plurality of data cables connected to the same network switch; and creating, by the orchestrator server and in response to the request for creation of the low-latency virtual machine, the low-latency virtual machine with use of the one or more sleds.

Example 32 includes the subject matter of Example 31, and wherein the one or more sleds comprises a storage sled.

Example 33 includes the subject matter of any of Examples 31 and 32, and wherein the low latency zone comprises at least 128 sleds.

Example 34 includes the subject matter of any of Examples 31-33, and further including receiving network utilization data of a plurality of workloads of the data center; analyzing the plurality of workloads based on the network utilization data to determine one or more workloads with high network utilization; and transferring the one or more workloads with high network utilization to one or more additional sleds in the low-latency zone.

Example 35 includes one or more computer-readable media comprising a plurality of instructions stored thereon that, when executed, causes a compute device to perform the method of any of Examples 31-34.

Example 36 includes an orchestrator server for managing resources of a data center, the orchestrator server comprising means for receiving a request for creation of a low-latency virtual machine; means for selecting, in response to the request for creation of the low-latency virtual machine, one or more sleds of the data center in a low-latency zone, wherein each sled in the low-latency zone is connected to the same network switch via a corresponding data cable of a plurality of data cables, wherein each data cable of the plurality of data cables has a length shorter than or approximately equal to the length of each other data cable of the plurality of data cables connected to the same network switch; and means for creating, in response to the request for creation of the low-latency virtual machine, the low-latency virtual machine with use of the one or more sleds.

Example 37 includes the subject matter of Example 36, and wherein the one or more sleds comprises a storage sled.

Example 38 includes the subject matter of any of Examples 36 and 37, and wherein the low latency zone comprises at least 128 sleds.

Example 39 includes the subject matter of any of Examples 36-38, and further including means for receiving network utilization data of a plurality of workloads of the data center; means for analyzing the plurality of workloads based on the network utilization data to determine one or more workloads with high network utilization; and means for transferring the one or more workloads with high network utilization to one or more additional sleds in the low-latency zone.

The invention claimed is:

1. A data center comprising:
   a network switch and
   a plurality of racks, wherein each rack of the plurality of racks is located in a corresponding zone of a plurality of zones,
     wherein each zone of the plurality of zones is associated with a minimum threshold distance and a maximum threshold distance that define a distance range, wherein no two distance ranges of the plurality of zones overlap with each other, and
     wherein each rack of the plurality of racks is defined as located in a zone of the plurality of zones if the distance from the network switch to the corresponding rack is above the minimum threshold distance associated with the corresponding zone and below a maximum threshold distance associated with the corresponding zone; and
   a plurality of data cables, wherein each rack of the plurality of racks is connected to the network switch with one of the data cables of the plurality of data cables and wherein each data cable of the plurality of data cables that is connected to a corresponding rack located in a same zone has approximately the same length.

2. The data center of claim 1, wherein each rack of the plurality of racks comprises a plurality of sleds, wherein each data cable of the plurality of data cables is connected directly to a sled of the plurality of sleds of a rack of the plurality of racks.

3. The data center of claim 1, wherein each data cable of the plurality of data cables comprises a passive optical cable.

4. The data center of claim 3, further comprising at least 256 sleds, wherein each of the at least 256 sleds is included in a rack of the plurality of racks.

5. The data center of claim 3, further comprising at least 1,024 sleds, wherein the at least 1,024 sleds is included in a rack of the plurality of racks.

6. The data center of claim 1, wherein each data cable of the plurality of data cables is connected to a top-of-rack switch of a rack of the plurality of racks.

7. The data center of claim 1, wherein each data cable of the plurality of data cables is a same color as each other data cable of the plurality of data cables that is approximately the same length as the corresponding data cable and is a different color from each other data cable of the plurality of data cables that is not approximately the same length as the corresponding data cable.

8. The data center of claim 1, further comprising at least 256 sleds, wherein each of the 256 sleds is included in a rack of the plurality of racks, wherein each rack connected to the network switch is in a zone of the plurality of zones, wherein the plurality of zones comprises at most 4 zones.

9. The data center of claim 1, further comprising a plurality of sleds, wherein each sled of the plurality of sleds is included in a rack of the plurality of racks, wherein at least half of the sleds in the zone closest to the network switch comprise storage sleds.

* * * * *